July 24, 1956  R. A. CHRISTIAN ET AL  2,755,993
TOTALIZER SELECTING AND CONTROL MECHANISMS
Original Filed Dec. 6, 1947  19 Sheets-Sheet 1

INVENTORS
RAYMOND A. CHRISTIAN
PAUL H. WILLIAMS &
ANDREW J. STRACHAN
BY
THEIR ATTORNEYS

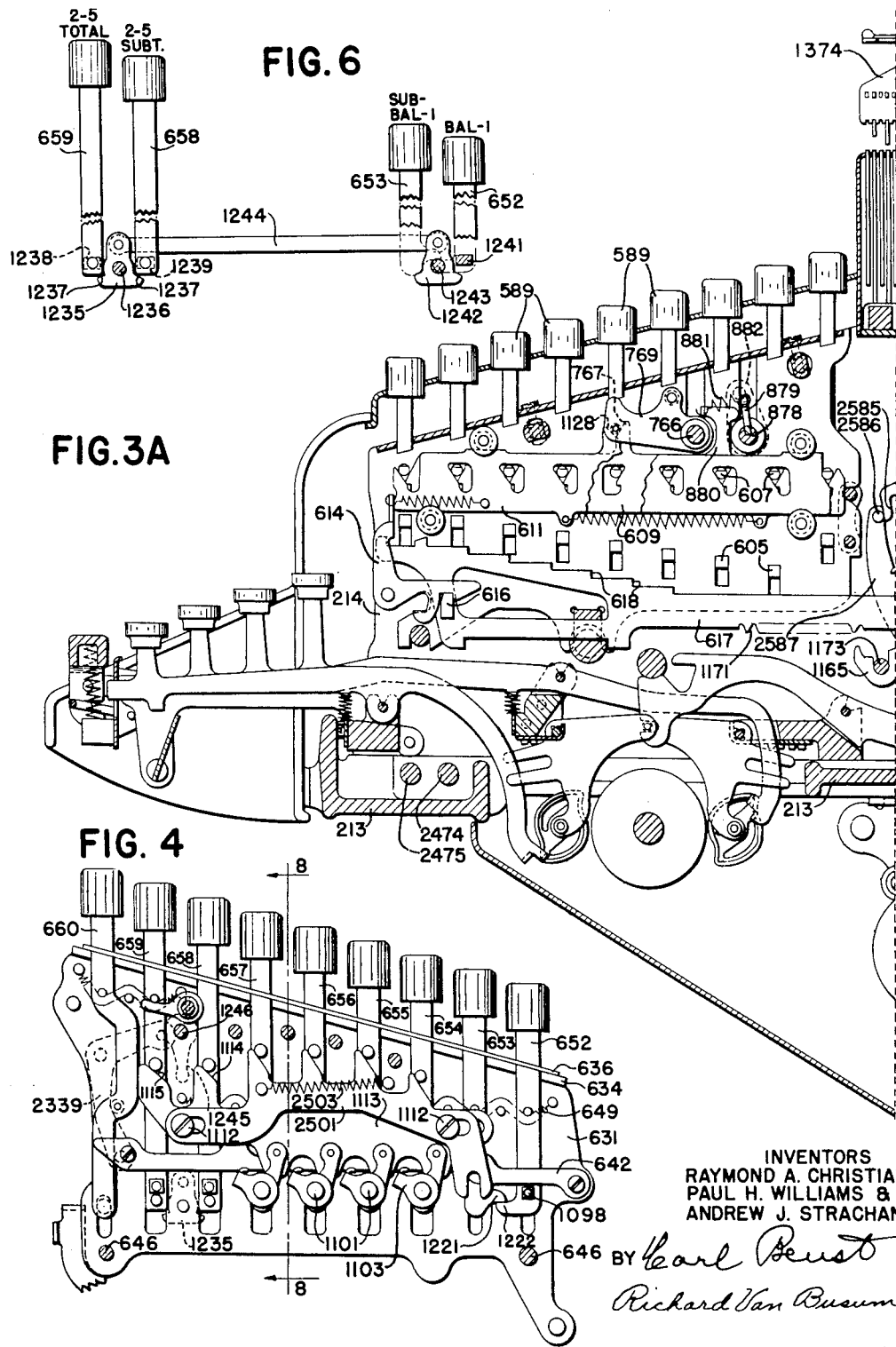

July 24, 1956 R. A. CHRISTIAN ET AL 2,755,993
TOTALIZER SELECTING AND CONTROL MECHANISMS
Original Filed Dec. 6, 1947 19 Sheets-Sheet 5

INVENTORS
RAYMOND A. CHRISTIAN
PAUL H. WILLIAMS &
ANDREW J. STRACHAN
BY Earl Beust
Richard Van Busum
THEIR ATTORNEYS July 24, 1956
R. A. CHRISTIAN ET AL
2,755,993
TOTALIZER SELECTING AND CONTROL MECHANISMS
Original Filed Dec. 6, 1947
19 Sheets-Sheet 6
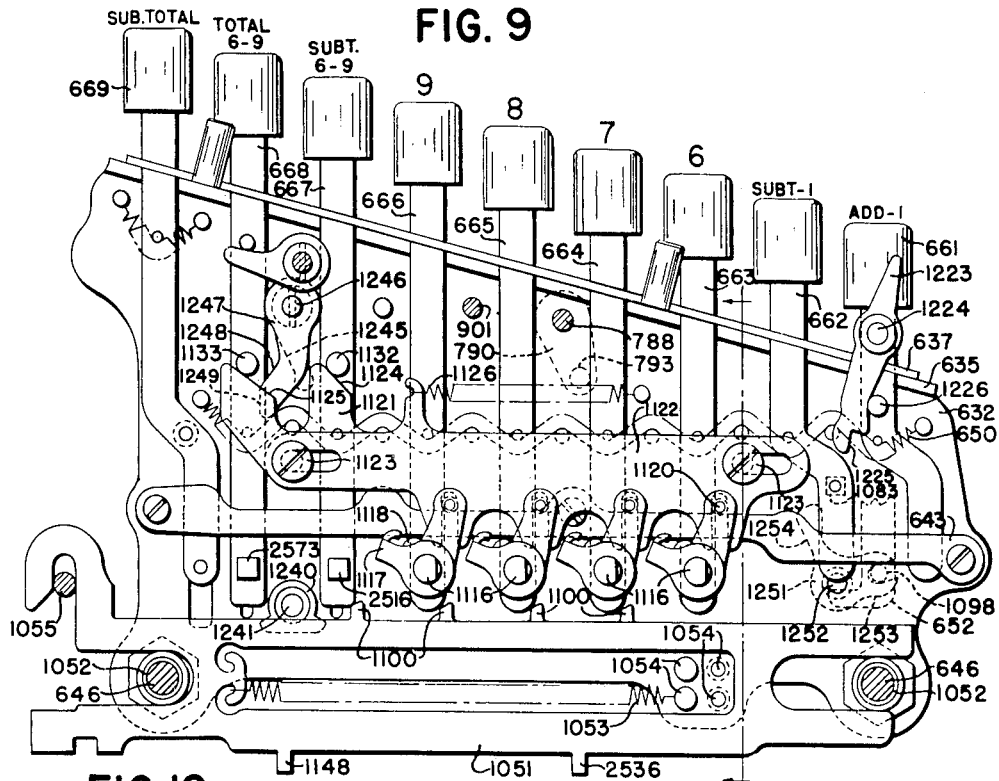
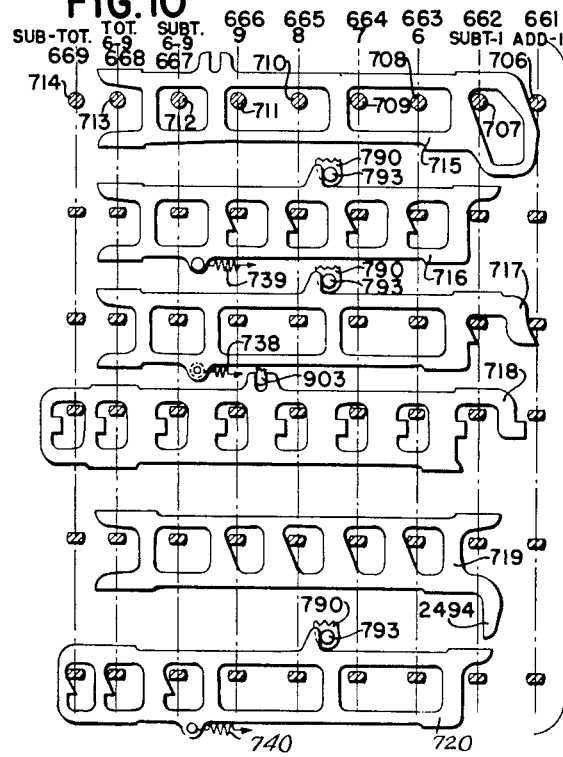
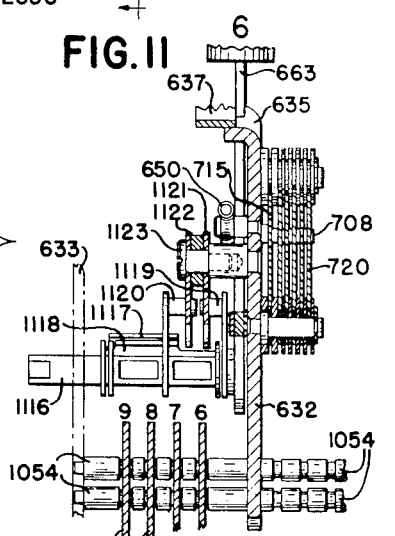
INVENTORS
RAYMOND A. CHRISTIAN
PAUL H. WILLIAMS &
ANDREW J. STRACHAN
BY Earl Beust
Richard Van Busum
THEIR ATTORNEYS

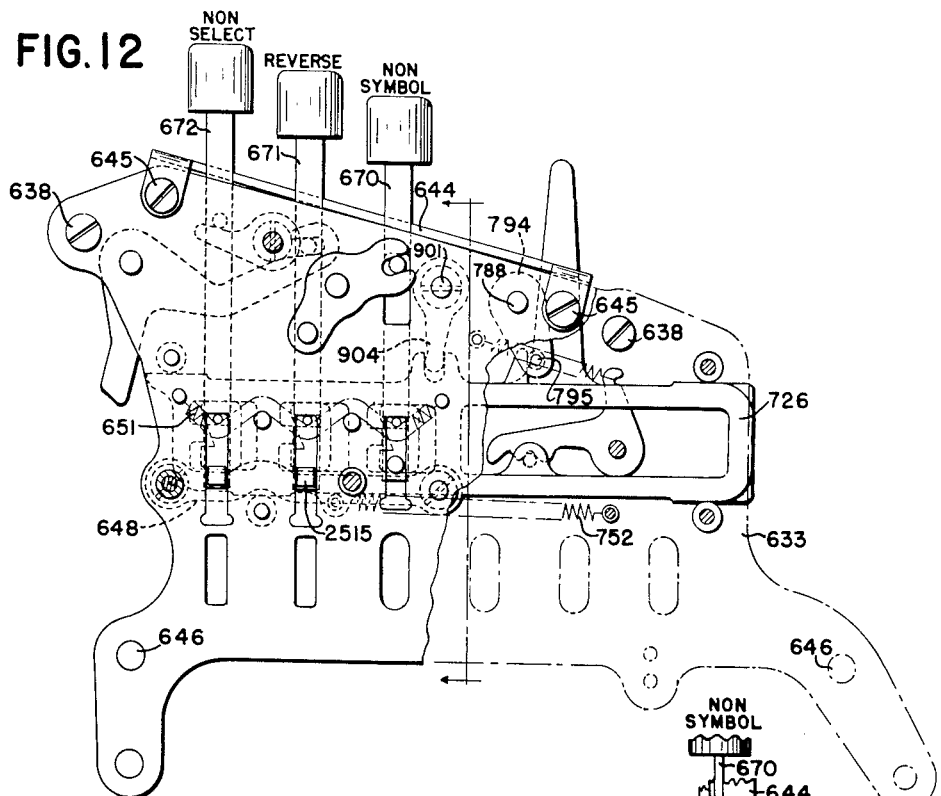
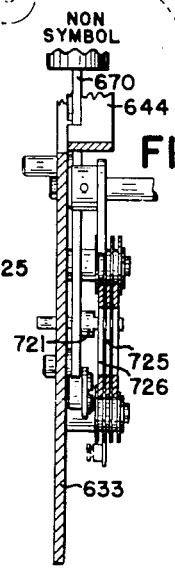
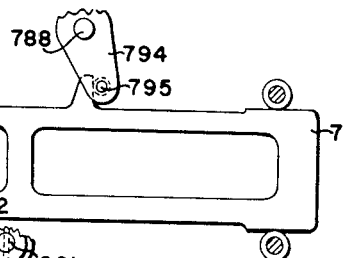
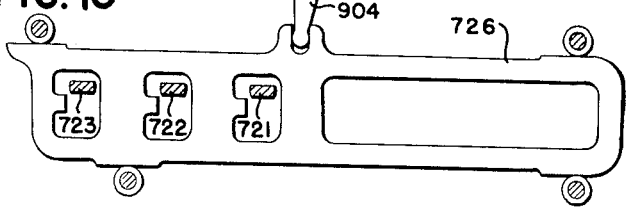

July 24, 1956  R. A. CHRISTIAN ET AL  2,755,993
TOTALIZER SELECTING AND CONTROL MECHANISMS
Original Filed Dec. 6, 1947  19 Sheets-Sheet 8
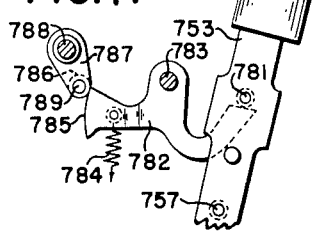
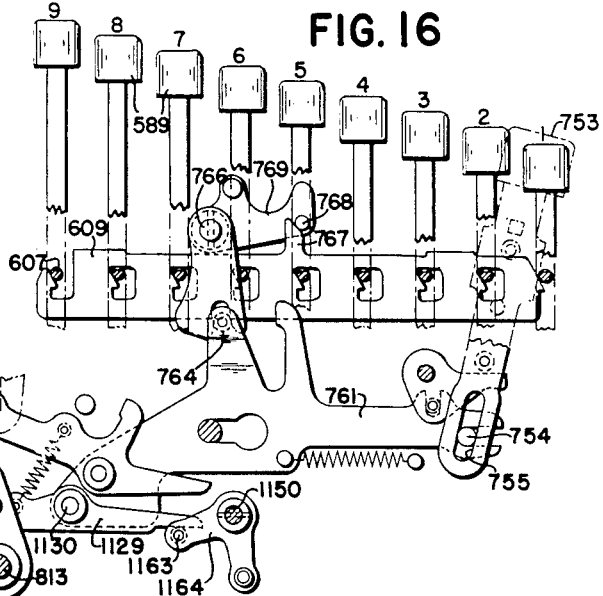
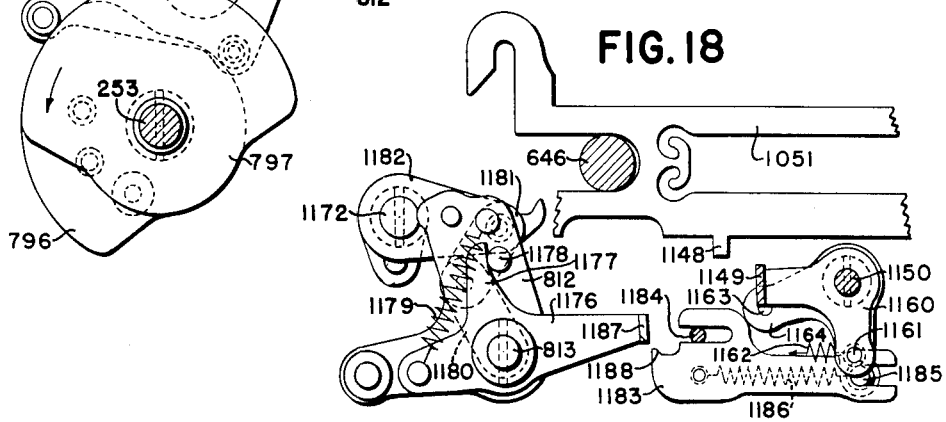
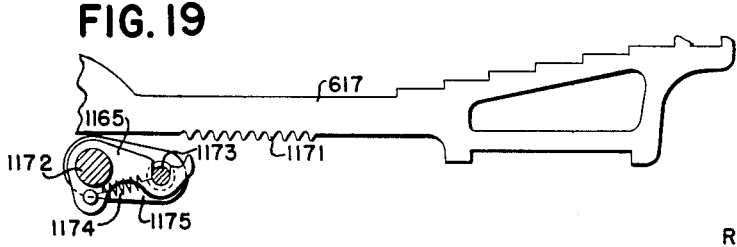
INVENTORS
RAYMOND A. CHRISTIAN
PAUL H. WILLIAMS &
ANDREW J. STRACHAN
BY
THEIR ATTORNEYS

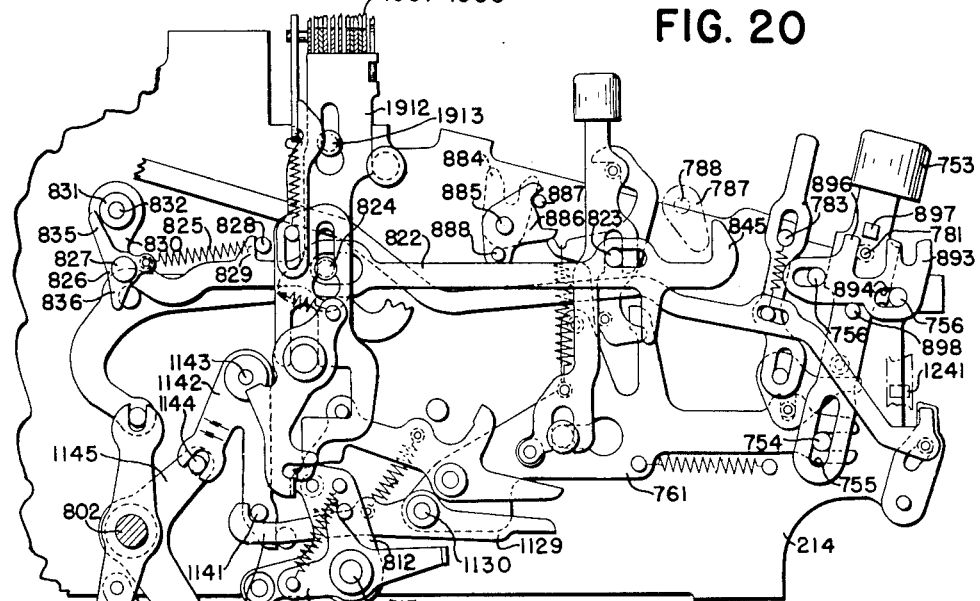

July 24, 1956  R. A. CHRISTIAN ET AL  2,755,993
TOTALIZER SELECTING AND CONTROL MECHANISMS
Original Filed Dec. 6, 1947  19 Sheets-Sheet 10
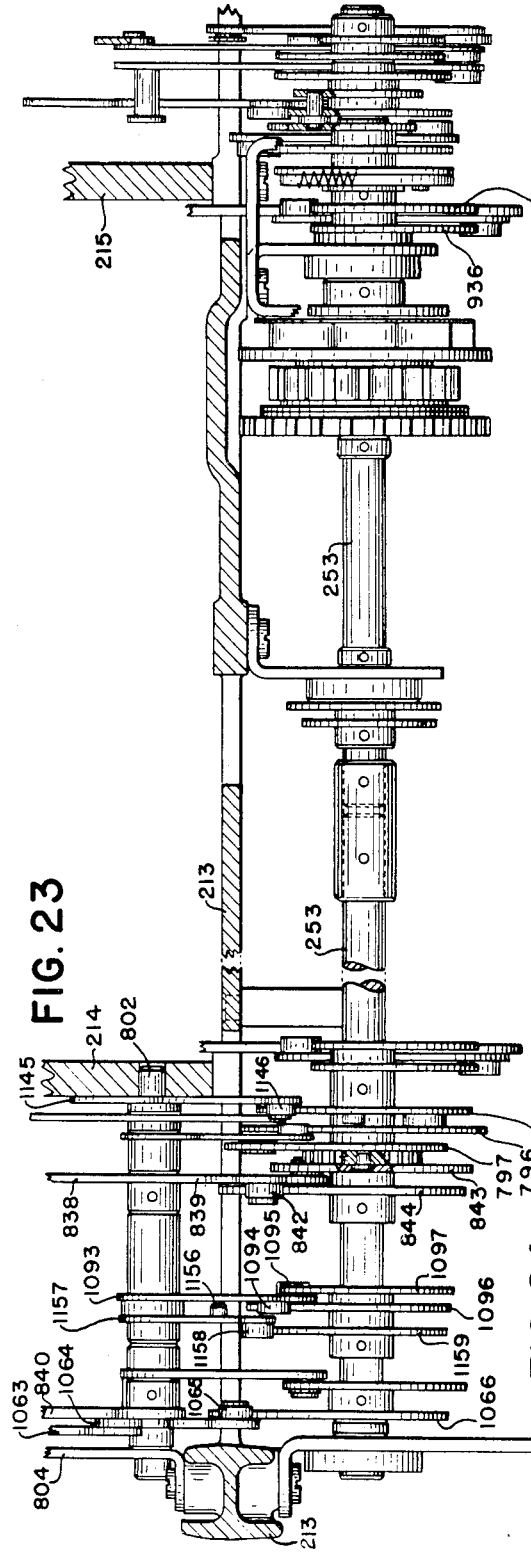
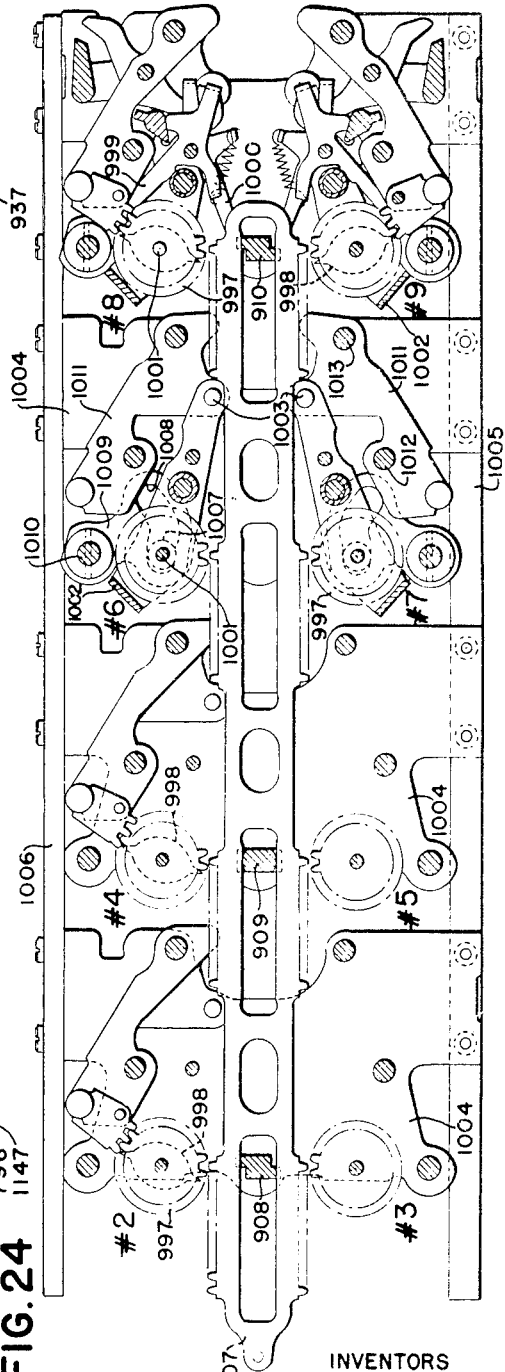
INVENTORS
RAYMOND A. CHRISTIAN
PAUL H. WILLIAMS &
ANDREW J. STRACHAN
BY Karl Beust
Richard Van Busum
THEIR ATTORNEYS

INVENTORS
RAYMOND A. CHRISTIAN
PAUL H. WILLIAMS &
ANDREW J. STRACHAN

BY Earl Beust
Richard Van Buskirk

THEIR ATTORNEYS

July 24, 1956   R. A. CHRISTIAN ET AL   2,755,993
TOTALIZER SELECTING AND CONTROL MECHANISMS
Original Filed Dec. 6, 1947                           19 Sheets—Sheet 12
FIG. 27
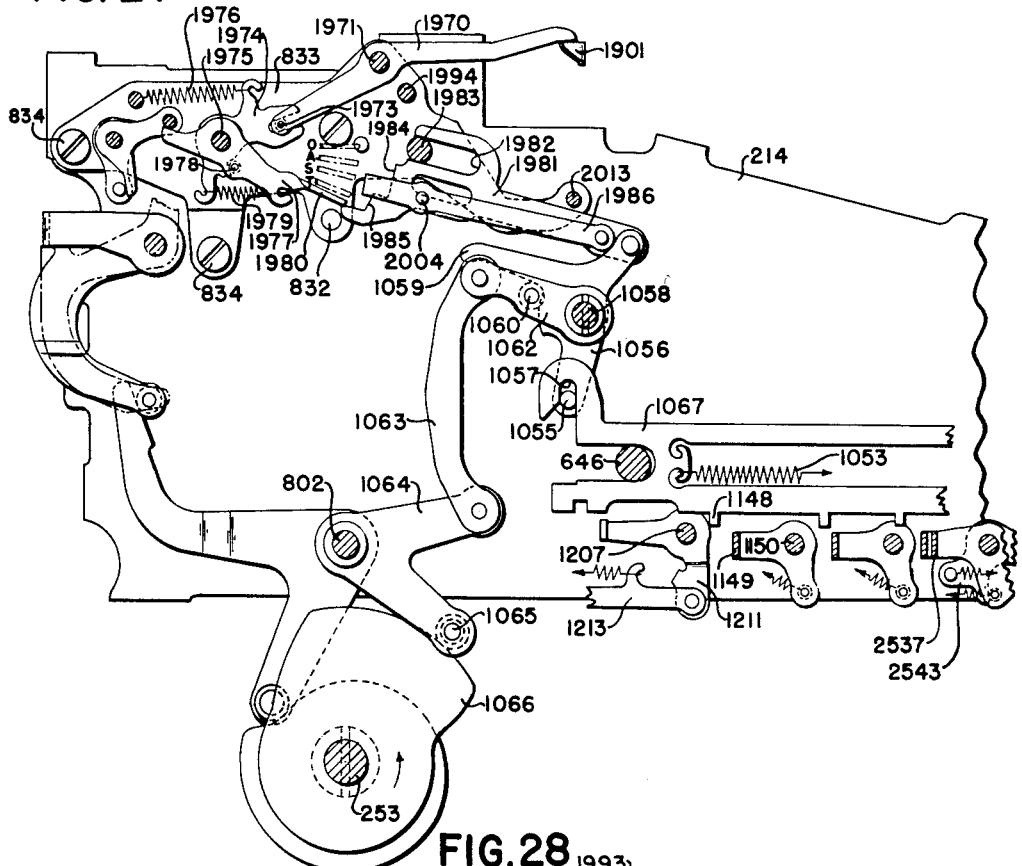
FIG. 28
FIG. 26
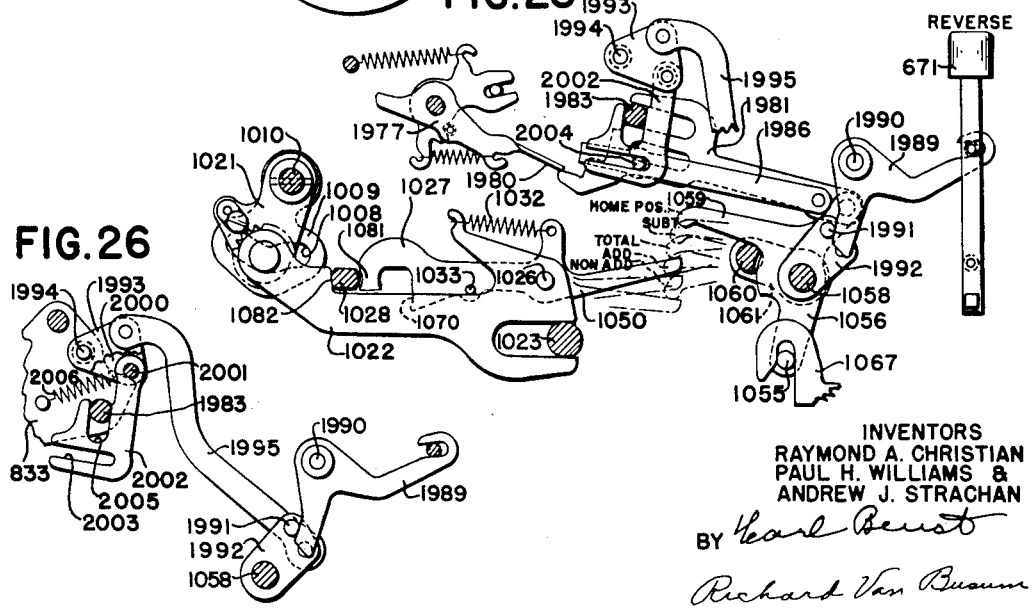
INVENTORS
RAYMOND A. CHRISTIAN
PAUL H. WILLIAMS &
ANDREW J. STRACHAN
BY Earl Benst
Richard Van Buaum
THEIR ATTORNEYS July 24, 1956 R. A. CHRISTIAN ET AL 2,755,993
TOTALIZER SELECTING AND CONTROL MECHANISMS
Original Filed Dec. 6, 1947 19 Sheets-Sheet 13
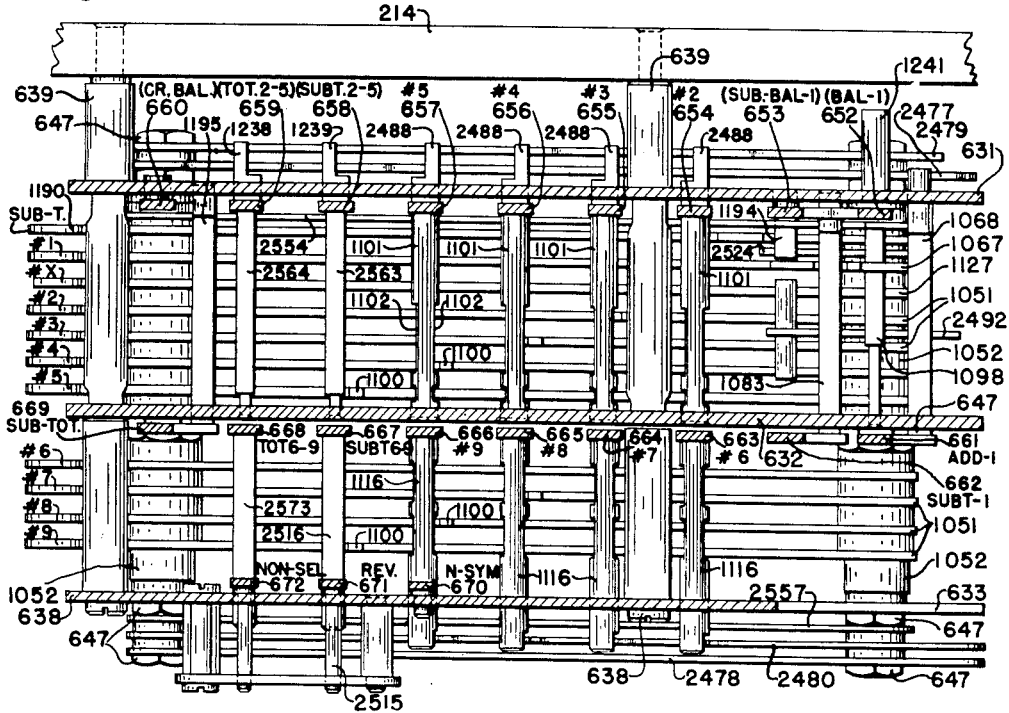
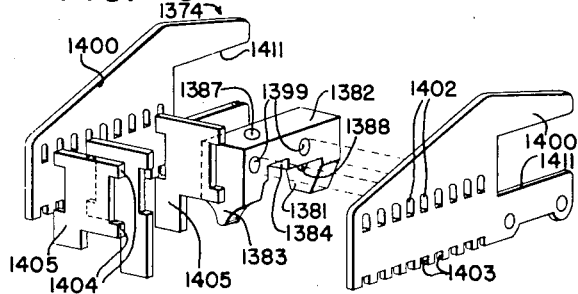
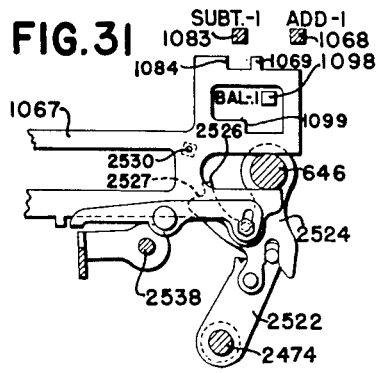
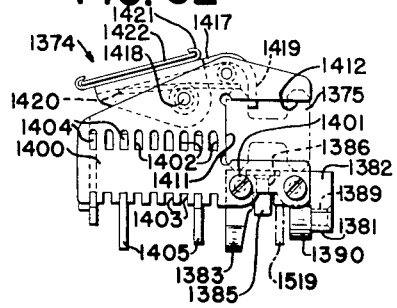
INVENTORS
RAYMOND A. CHRISTIAN
PAUL H. WILLIAMS &
ANDREW J. STRACHAN
BY Earl Beust
Richard Van Buren
THEIR ATTORNEYS

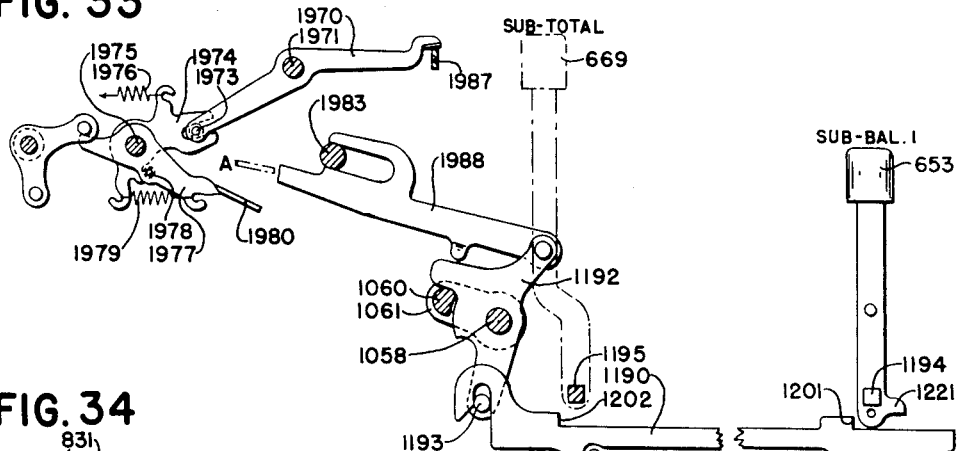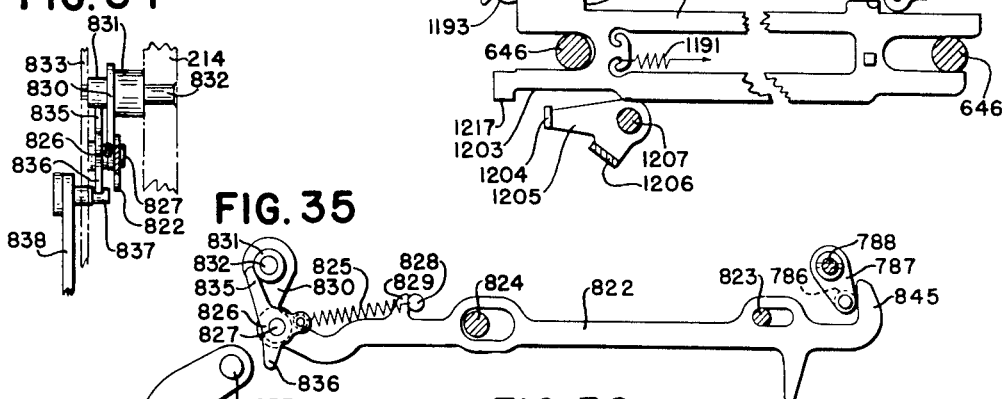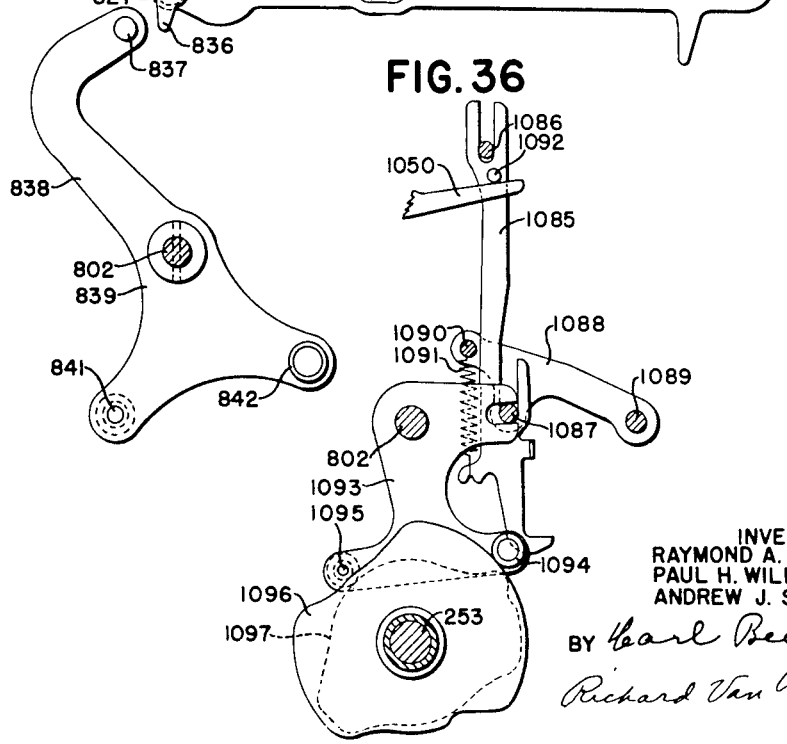

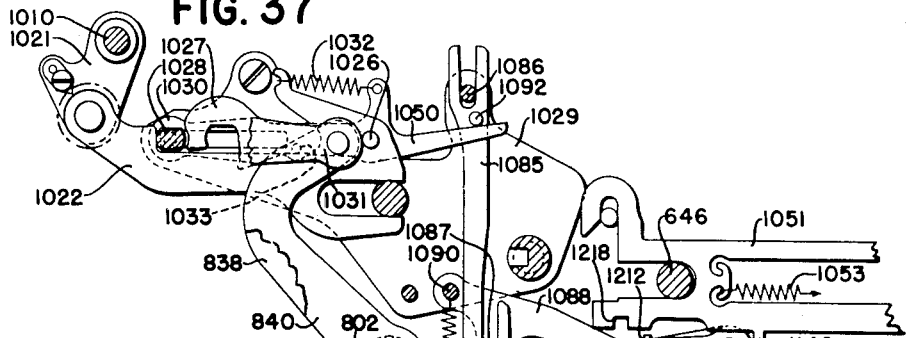
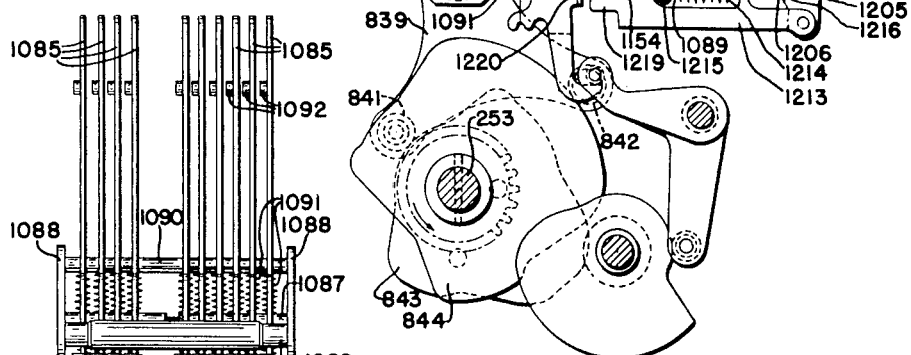
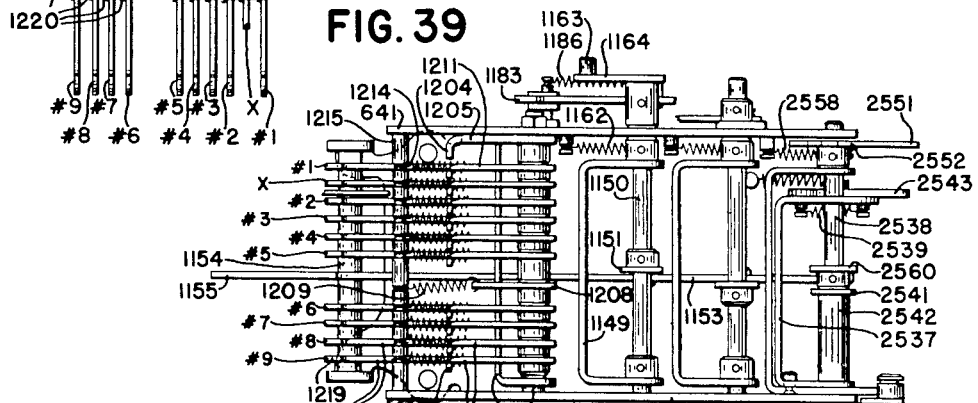
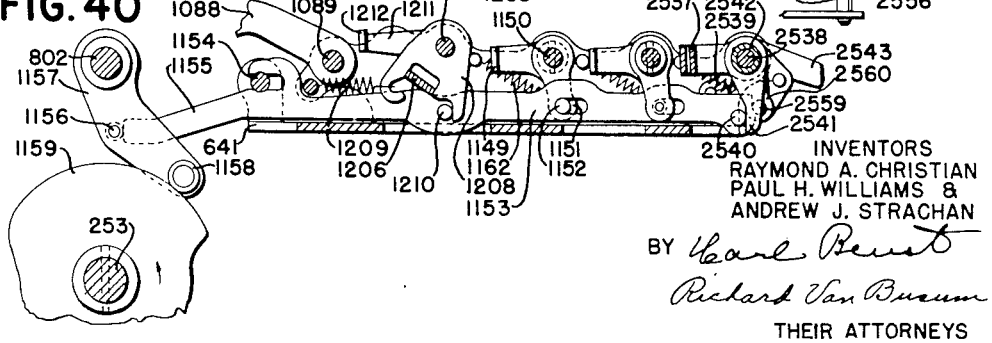

July 24, 1956  R. A. CHRISTIAN ET AL  2,755,993
TOTALIZER SELECTING AND CONTROL MECHANISMS
Original Filed Dec. 6, 1947  19 Sheets-Sheet 17

FIG. 42

INVENTORS
RAYMOND A. CHRISTIAN
PAUL H. WILLIAMS &
ANDREW J. STRACHAN
BY Carl Berot
Richard Van Busum
THEIR ATTORNEYS July 24, 1956  R. A. CHRISTIAN ET AL  2,755,993
TOTALIZER SELECTING AND CONTROL MECHANISMS
Original Filed Dec. 6, 1947  19 Sheets-Sheet 18

INVENTORS
RAYMOND A. CHRISTIAN
PAUL H. WILLIAMS &
ANDREW J. STRACHAN
BY
THEIR ATTORNEYS

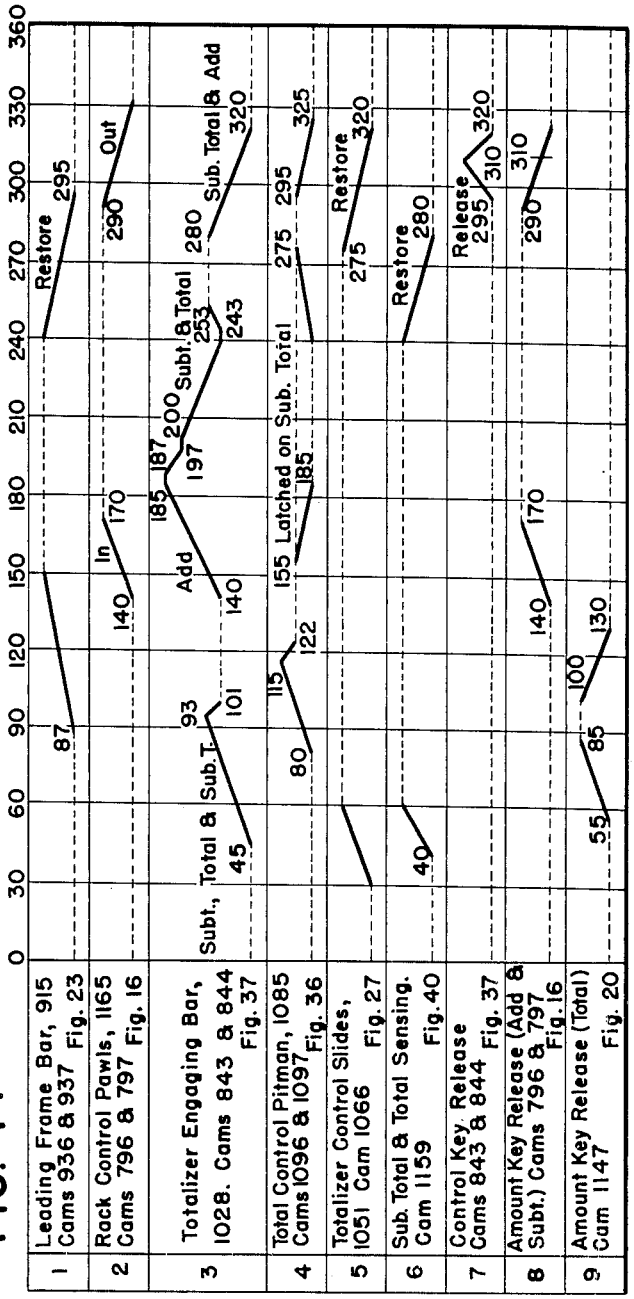

United States Patent Office 2,755,993
Patented July 24, 1956

2,755,993
TOTALIZER SELECTING AND CONTROL MECHANISMS

Raymond A. Christian, Paul H. Williams, and Andrew J. Strachan, Dayton, Ohio, assignors to The National Cash Register Company, Dayton, Ohio, a corporation of Maryland Original application December 6, 1947, Serial No. 790,032. Divided and this application May 29, 1952, Serial No. 290,772

15 Claims. (Cl. 235—60.48)

This invention relates to accounting and similar calculating machines, and is more particularly concerned with mechanism for controlling the selection and engagement of the totalizers for different types of operations.

This application is a division of the co-pending application for United States Letters Patent filed on December 6, 1947, by Raymond A. Christian et al., Serial No. 790,032, now United States Patent No. 2,626,749.

Modern business systems are so diverse, and, in some instances, so complex, that it is necessary that machines should be extremely flexible in character. For this purpose it is particularly desirable that, in a machine including a plurality of totalizers, such as adding and subtracting totalizers, their selection and engagement should be controlled so as to give the greatest flexibility of control by the simplest possible means.

Therefore it is the principal object of the present invention to provide a simple, economical, and efficient mechanism for enabling any add-subtract totalizer to be controlled from the control keys of the keyboard for adding, subtracting, and total-taking operations.

Another object of the invention resides in the provision of novel means for controlling the various functions of the machine either from the traveling paper carriage or from certain of the manipulative keys situated on the keyboard of the machine.

Still another object of the invention is to provide a novel mechanism for reversing the sign of the entries into the various totalizers on any given operation of the machine, thereby enabling erroneous entries to be easily and quickly removed from the machine, and also for enabling "reverse" operations to be performed whenever this becomes necessary or desirable in performing the work at hand.

With these and other objects in view which will become apparent from the following description, the invention includes certain novel features of design and combinations of parts, a preferred form or embodiment of which is hereinafter described with reference to the drawings which accompany and form a part of this specification.

Figure 3B:
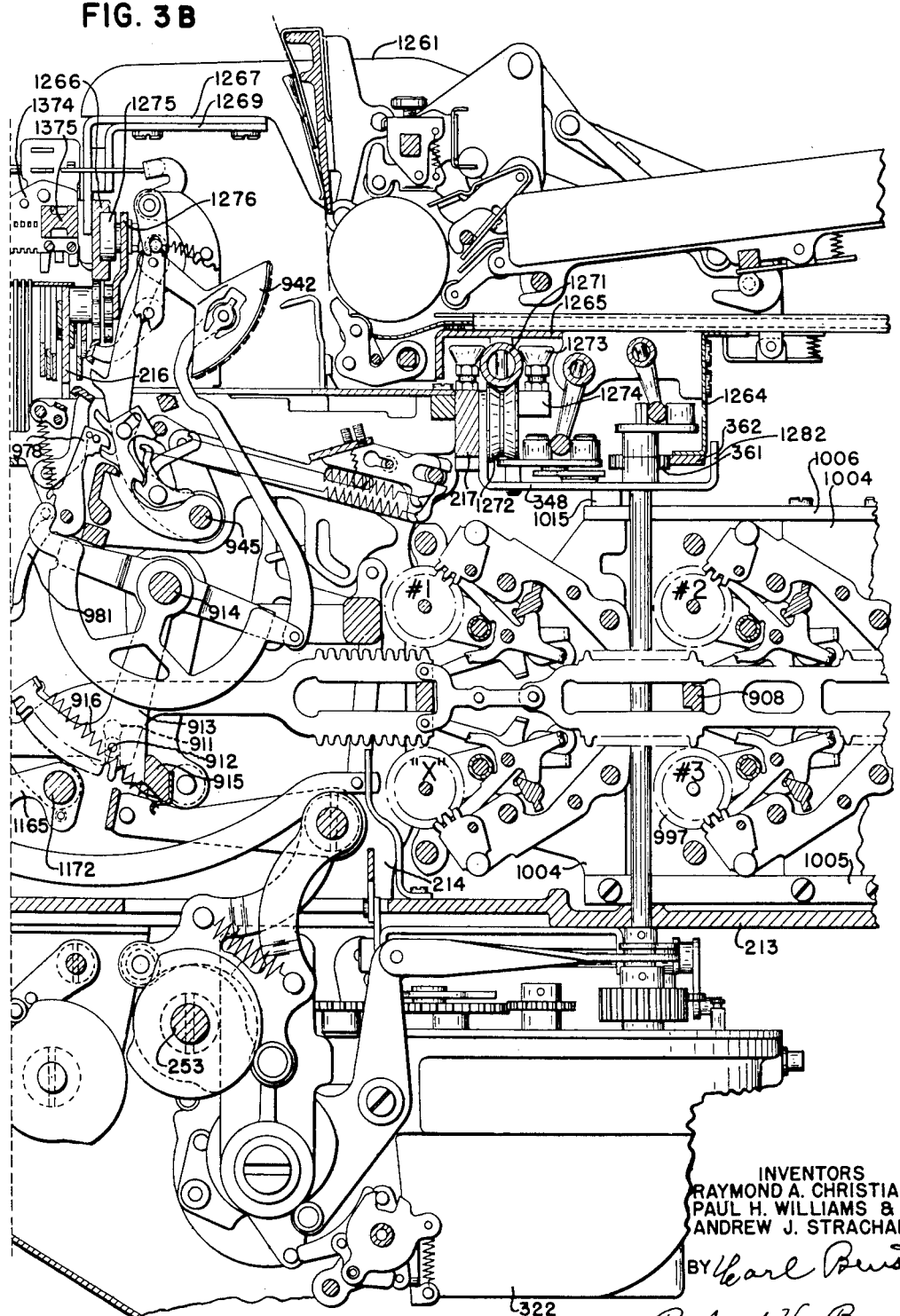

Figs. 3A and 3B, taken together, constitute a longitudinal sectional view taken just to the right of one of the amount banks.

Fig. 4 is a left side elevation of the right-hand bank of function control keys.

Fig. 5 is a perspective view of one of the control keys shown in the preceding figure.

Fig. 6 is a detail view of an interlock between certain of the control keys shown in Fig. 4.

Figure 7:
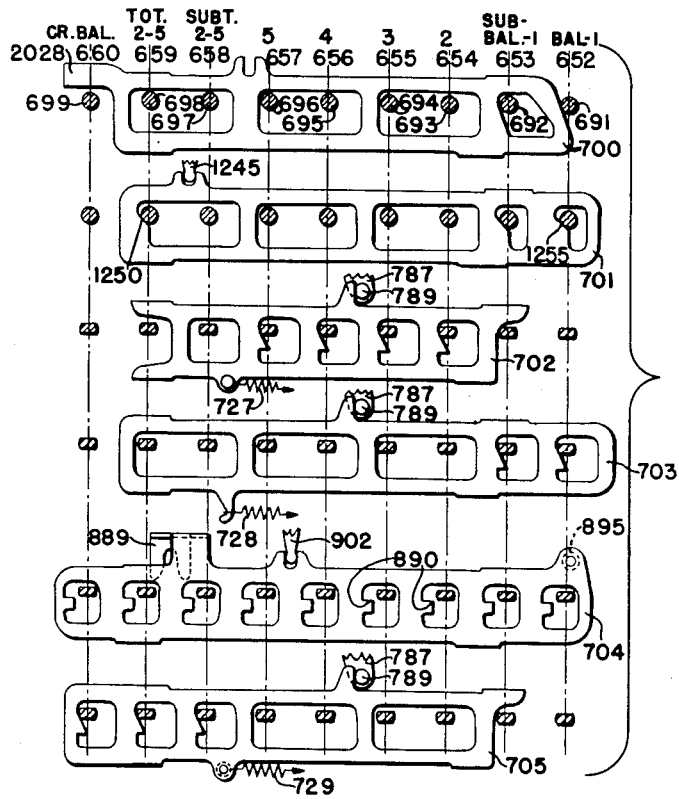

Fig. 7 is a diagrammatic view showing the various slides associated with the right-hand bank of control keys.

Figure 8:
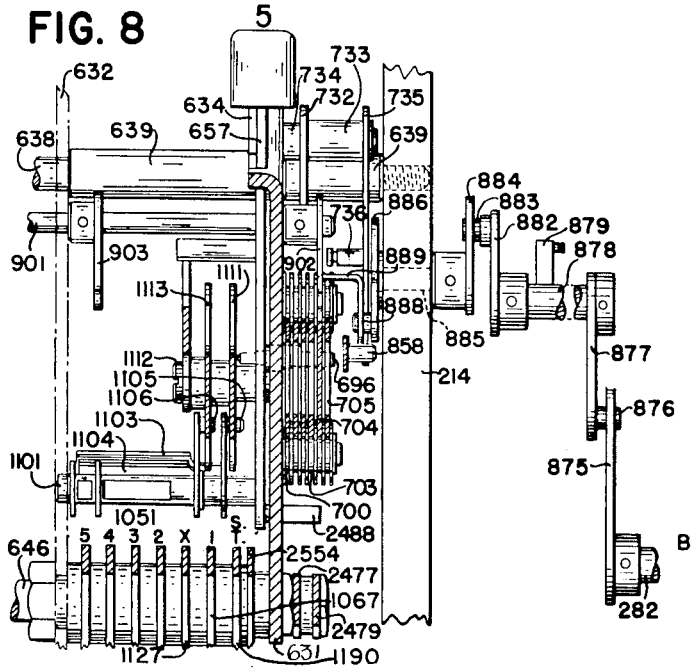

Fig. 8 is a sectional view of the right-hand bank of function control keys taken on the line 7—7 in Fig. 4.

Fig. 9 is a left side elevation of the centre bank of function control keys showing in particular the cooperation between these keys and the totalizer control slides lying therebeneath.

Fig. 10 is a diagrammatic view showing the various slides associated with the centre bank of control keys.

Fig. 11 is a cross-sectional view taken on the line 11—11 in Fig. 9.

Fig. 12 is a left side elevation of the left-hand bank of function control keys.

Fig. 13 is a cross-sectional view taken along the line 13—13 in Fig. 12.

Figs. 14 and 15 are diagrammatic views showing the locking and latching slides associated with the left-hand bank of control keys.

Fig. 16 is a left side elevation of the key release mechanism for the amount key banks.

Fig. 17 is a fragmentary view showing a portion of the manual key release mechanism.

Fig. 18 is a detail view of the rack control pawl mechanism which is rendered effective on total-taking operations to prevent jumping of the differential actuators.

Fig. 19 is a view showing in further detail the mechanism illustrated in the preceding figure.

Fig. 20 is a left side elevation of the various control mechanisms which are mounted on the outside of the left side frame of the machine.

Fig. 21 is a detail view showing part of the key locking mechanism provided in this machine.

Fig. 22 is a detail view showing part of the key latching mechanism for the amount banks.

Fig. 23 is a front elevation of the main cam shaft of the machine.

Fig. 24 is a sectional view taken through the totalizers of the machine.

Figure 25:
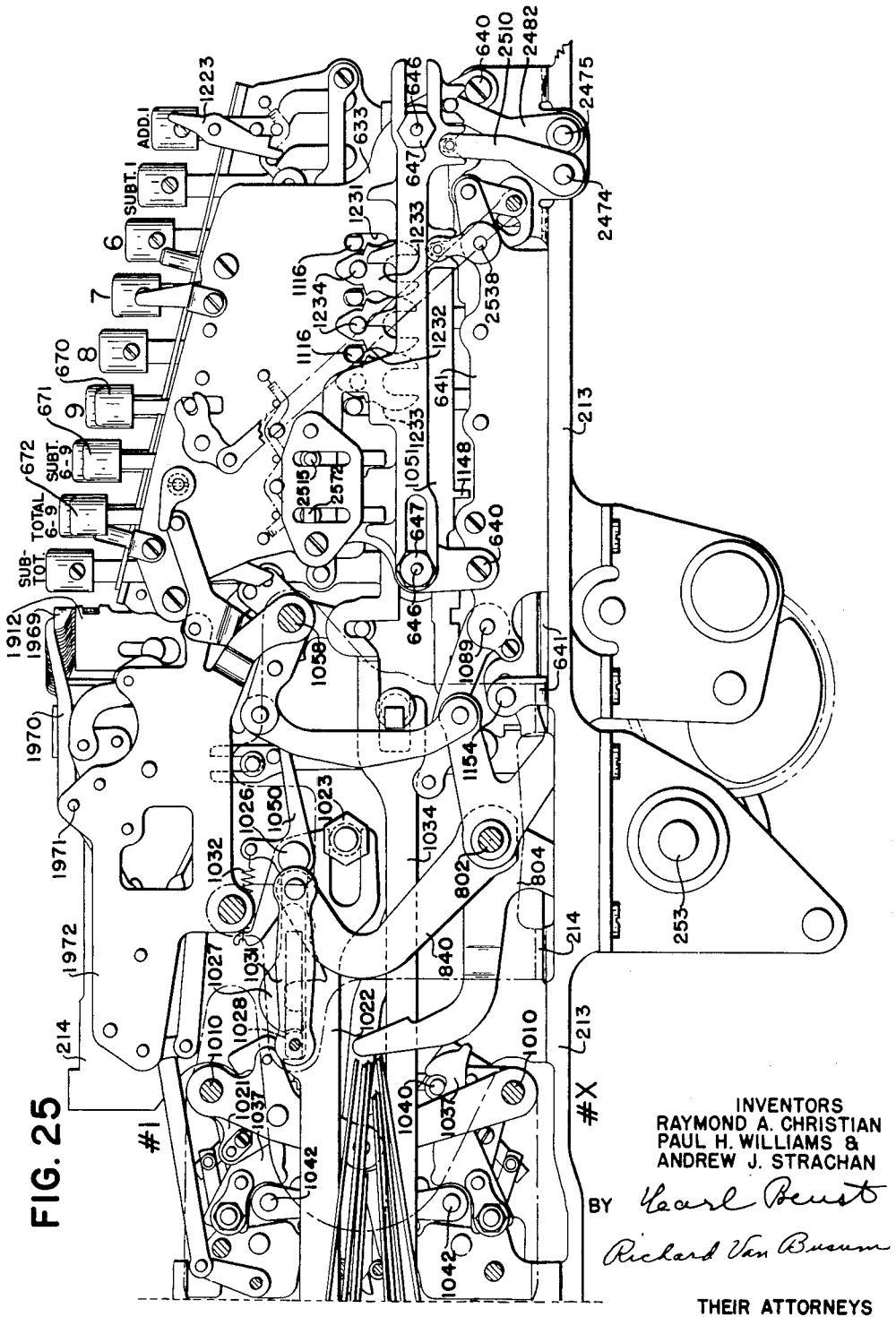

Fig. 25 constitutes a left side elevation of the front portion of the present machine.

Fig. 26 is a fragmentary view showing a portion of the mechanism illustrated in Figure 28.

Fig. 27 is a left side elevation of the mechanism controlled by the travelling paper carriage for selecting the totalizers for addition, subtraction, or total-taking operations.

Fig. 28 is a view similar to that shown in the preceding figure, but including in addition thereto the mechanism for reversing the add or subtract selection of the totalizer.

Fig. 29 is a plan view showing the totalizer control slides and the symbol-printing control slides, together with the studs on the control keys which cooperate with these slides.

Fig. 30 is a disassembled perspective view of one of the carriage stops used for controlling the various functions of the machine in accordance with the columnar position of the traveling paper carriage.

Fig. 31 is a fragmentary view showing the forward end of the No. 1 totalizer slide and certain of the symbol-printing control mechanism cooperating therewith.

Fig. 32 is a detail view of one of the carriage stops which is used to control the various functions of the machine.

Fig. 33 is a left side elevation of a portion of the sub-total-taking control mechanism.

Fig. 34 is a front elevation of a portion of the mechanism for releasing the function control keys automatically during the machine cycle.

Fig. 35 is a left side elevation of the automatic release mechanism for the function control keys.

Fig. 36 illustrates a part of the totalizer-engaging mechanism as viewed from the left-hand side of the machine.

Fig. 37 is a left side elevation showing in further detail the totalizer-engaging mechanism and the means whereby this mechanism is controlled by the sub-total-taking control means.

Fig. 38 is a front view of the pitmans which control the engagement of the totalizers during subtract and sub-total-taking operations.

Fig. 39 is a plan view of the devices used for sensing off the lower edges of the totalizer control slides thereby to control certain functions of the machine.

Fig. 40 is a left side elevation of the mechanism shown in the preceding figure.

Figure 41:
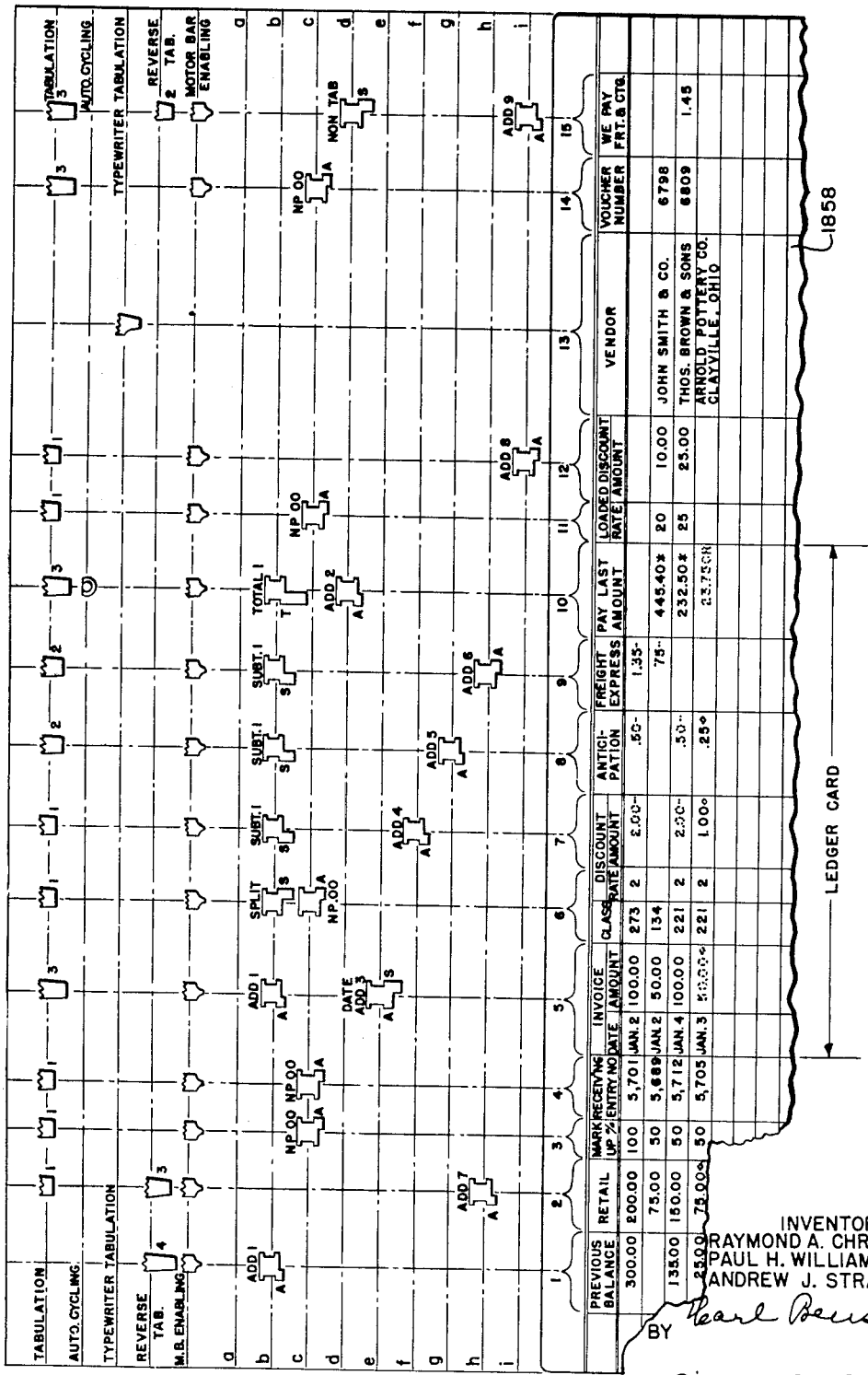

Fig. 41 is a composite view showing a facsimile of a journal sheet on which various numerical and typewritten entries have been made by a machine of the type presently being described, and also showing in a schematic fashion the makeup of the carriage stops in each of the various columnar positions.

Fig. 42 is a front elevation showing the sensing levers which cooperate with the carriage stops for the purpose of controlling the various machine functions.

Figure 43:
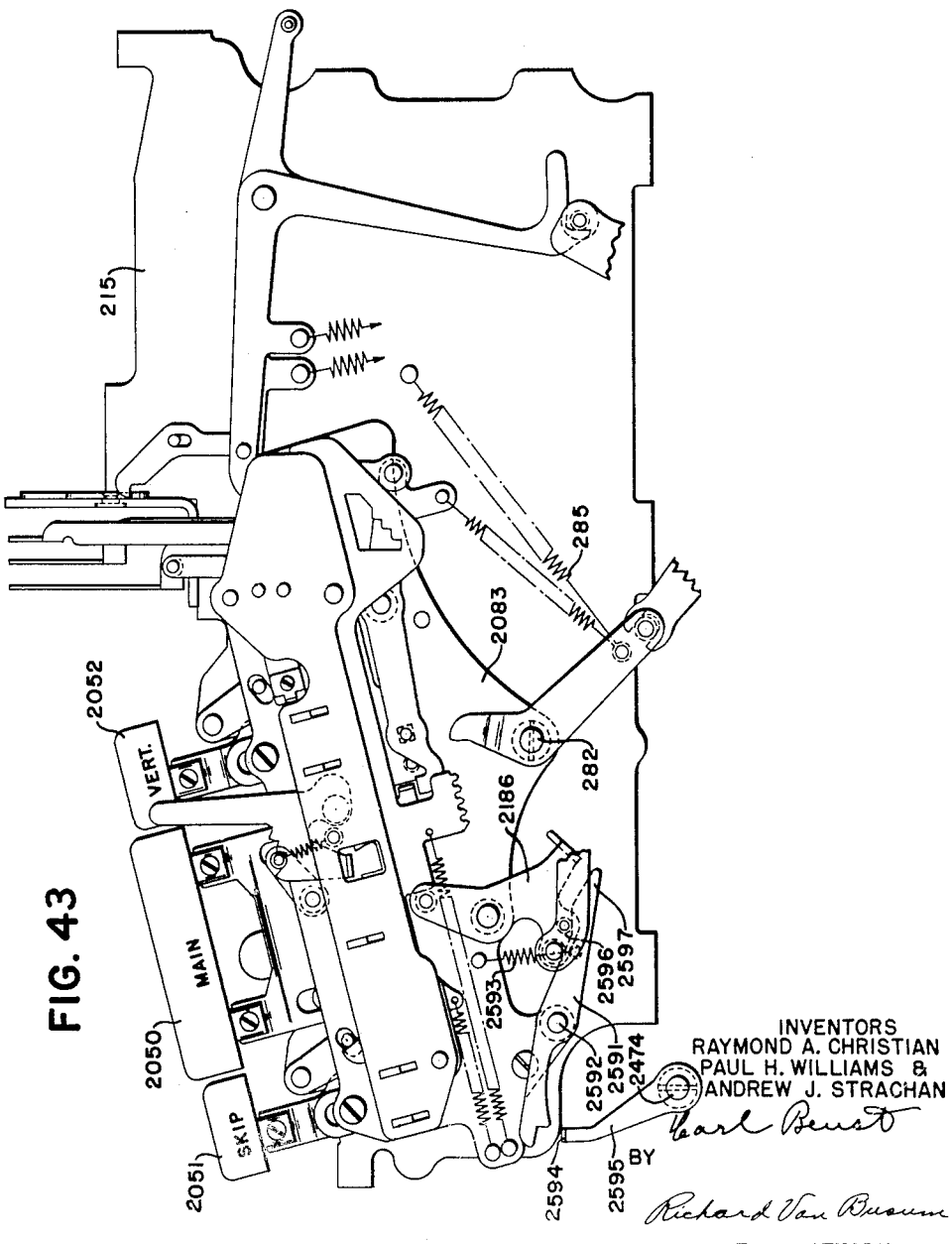

Fig. 43 is a right side elevation showing the motor bars and the mechanism controlled thereby for controlling certain of the machine functions.

Fig. 44 constitutes a time chart showing the time in the machine cycle when the various mechanisms relating to the present invention operate.

The complete machine to which the present invention is shown as applied, by way of example only, is fully disclosed in co-pending United States application, Serial No. 790,032, now United States Patent No. 2,626,749, and, in the present specification, those parts only of the machine are described which are necessary for an understanding of the functions exercised by the totalizer control keys and the totalizer reversing mechanism.

Figure 1:
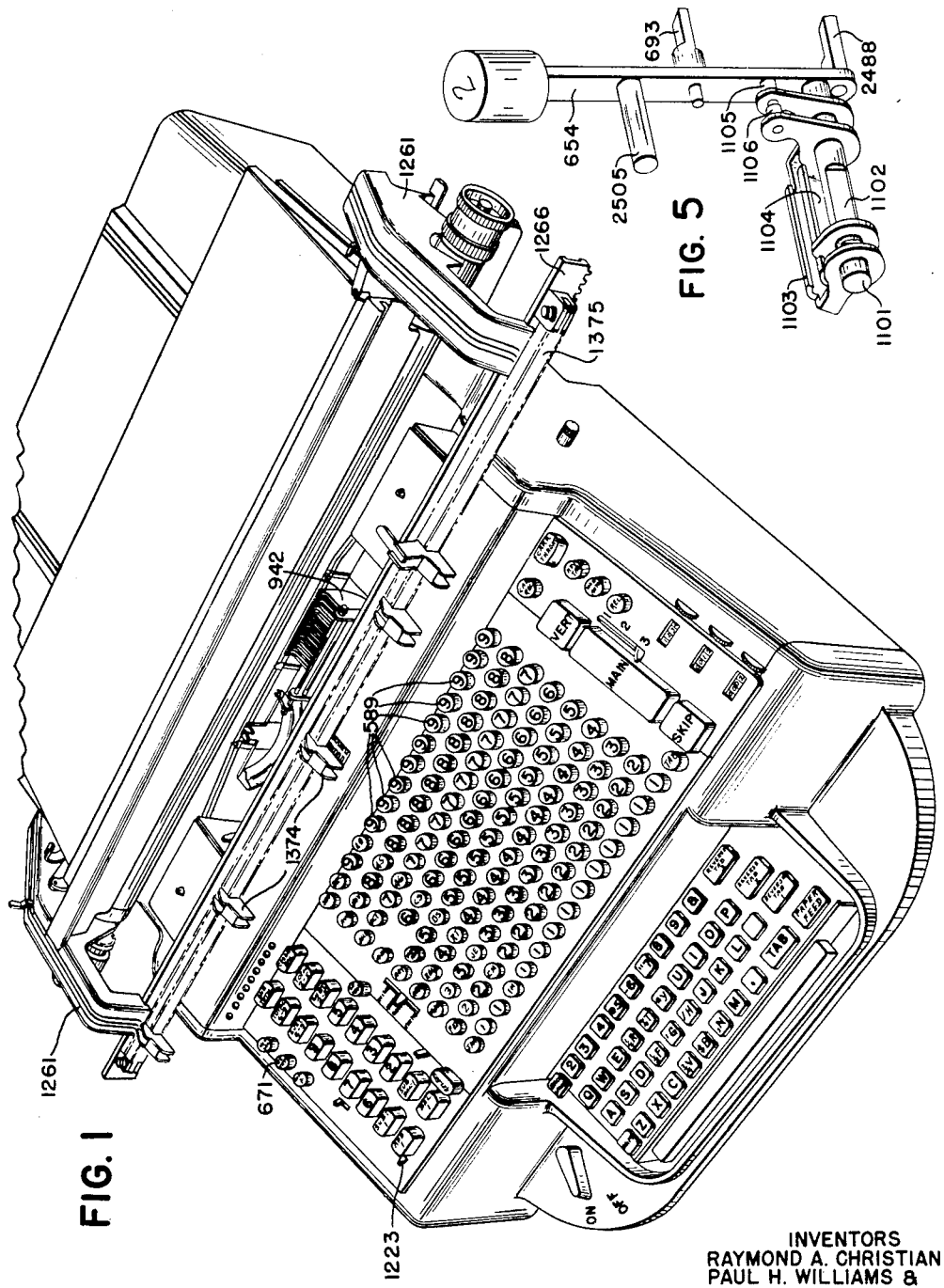
Fig. 1 is a perspective view of the complete machine.

A perspective view of the machine as a whole is shown in Figure 1 of the drawings, and a general understanding of the layout and organization of the machine may be obtained from this illustration. As shown herein, a typewriter keyboard is located at the front end of the machine, while just behind and somewhat above this keyboard is a keyboard on which may be set up the various additive and non-additive items which are to be entered in the accounting machine. To the left of the amount keyboard is a control keyboard containing the various function control keys, while to the right of it are located a plurality of motor bars and carriage control keys. In the center, just above the amount keyboard, are a group of type sectors for the accounting machine, while just to the left of these sectors is located a type basket for the electric typewriter. Immediately behind the aforementioned printing mechanism is a rotatable platen in which accounting forms and/or the other record material may be supported, this platen being of the "Front feed" type and mounted on a travelling carriage 1261 which is movable back and forth across the machine to selected columnar positions. Behind the paper carriage is shown that part of the machine cabinet which houses ten add-subtract totalizers. At the front of the machine, just to the left of the typewriter keyboard, is a switch lever for starting and stopping a continuously running electric motor, which drives the various operating mechanisms of the machine.

The machine is operated by means of an electric motor (not shown) which directly drives a shaft (not shown), the latter rotating constantly so long as the motor circuit is closed.

A main cam shaft 253 is adapted to be clutched to the motor drive shaft under control of the control keys, or by means of motor bars 2050, 2051 and 2052 (Fig. 2) in a suitable manner.

Function control keys

Figure 2:
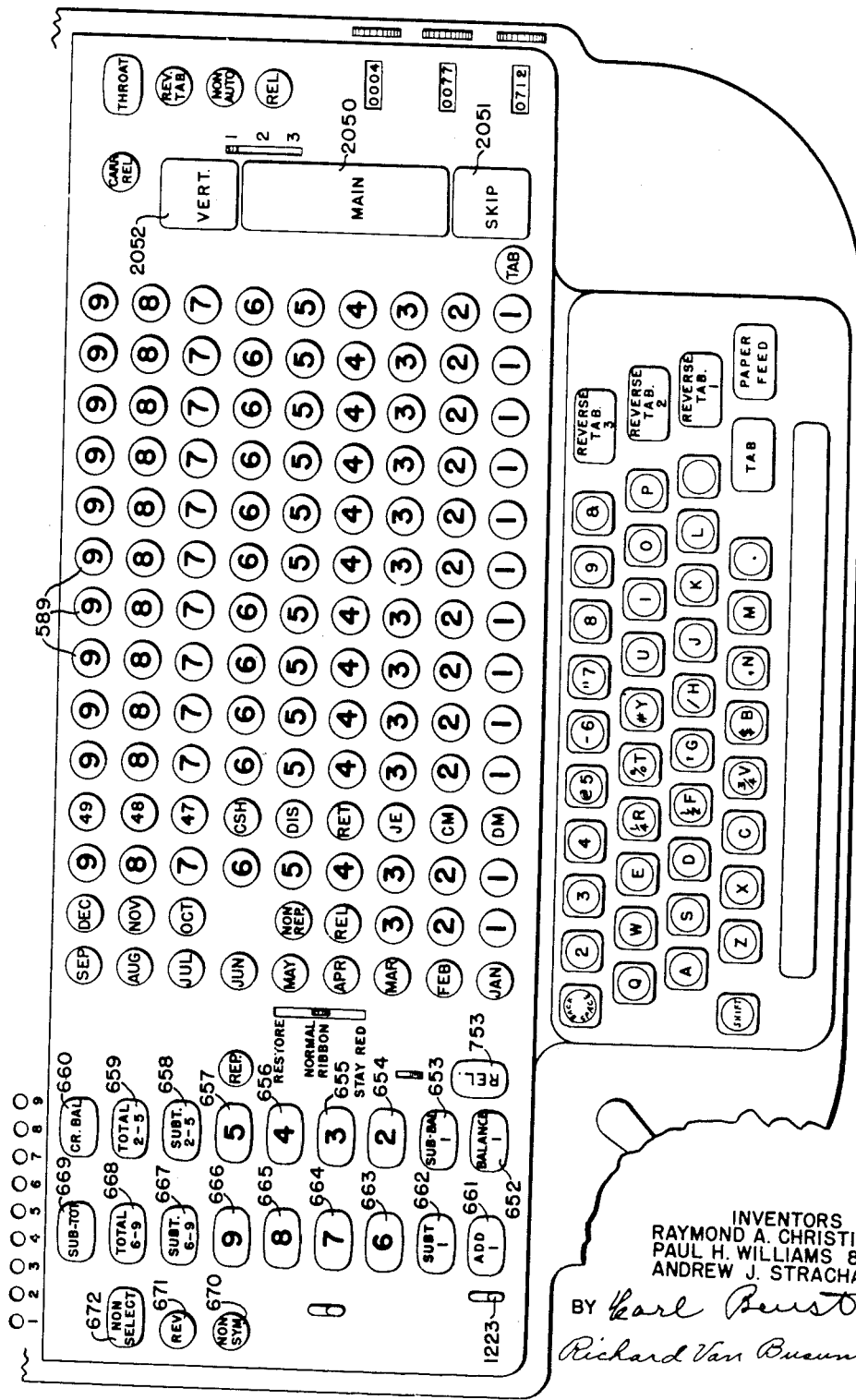
Fig. 2 is a plan view of the calculating machine and typewriter keyboards of the machine shown and described herein.

Located on the left-hand side of the accounting machine keyboard is a group of keys for controlling the selection and operation of the various totalizers of the machine. As shown in Figures 1 and 2, there are three rows or banks of these function control keys, which are illustrated in greater detail in Figures 4, 9 and 12. The keys in each row are supported for sliding movement in a vertical direction on partition plates 631, 632 and 633, respectively (see Figures 4, 9 and 12).

The partition plates are attached to the framework of the machine by means of a pair of long bolts 638 (Figs. 12 and 29), which pass through suitable holes provided therefor in the partition plates and then screw into a left side frame 214. Spacing sleeves 639 are provided on the bolts between adjoining pairs of partition plates and between the plate 631 and the side frame 214, so as to maintain the proper side spacing. In addition, the partition plate 633 is attached by screws 640 to a bracket 641 (Fig. 25) mounted on a machine base 213. The lower ends of the partition plates are secured to one another by means of a pair of bolts 646 (Figs. 4, 9, 12 and 25), on which are screwed nuts 647 (Fig. 29), which, together with appropriate spacing sleeves, hold the bottoms of the plates in fixed relationship with respect to one another.

The control keys in the two right-hand rows are guided at their upper ends by means of slots provided in lips 634 (Figs. 4 and 8) and 635 (Figs. 9 and 11), which are bent off from the upper edge of the partition plates 631 and 632, respectively, the keys being retained within these slots by means of retaining strips 636 and 637, which are removably secured to the aforementioned lips. The keys are guided at their lower ends by means of studs thereon, which pass through elongated slots provided in the partition plates, the keys being retained against the partition plates by means of retaining bars 642 and 643, which are removably secured to their respective partition plates. The three keys contained in the left-hand row are supported at their upper ends for sliding movement on the partition plate 633 by means of notches provided in a retaining strip 644, which is secured to the partition plates by means of screws 645 (Fig. 12). On their lower ends, the keys are provided with studs which are received within elongated slots in the partition plates 633, the keys being held in place by means of a retaining bar 648 secured to the plate 633. The control keys are urged upwardly by means of long coil springs 649, 650 and 651, which are passed in a sinuous manner between studs on the keys and studs secured in the partition plates, as clearly illustrated in the drawings.

Referring to Figure 2, it will be seen that the right-hand bank of control keys comprises a "Balance 1" key 652, a "Sub-Balance 1" key 653, a group of four totalizer selection keys 654, 655, 656, and 657 for the No. 2, No. 3, No. 4 and No. 5 totalizers, a "Subtract 2–5" key 658, a "Total 2–5" key 659, and a "Credit Balance" key 660. In a like manner, the center bank of control keys comprises an "Add 1" key 661, a "Subtract 1" key 662, a group of four totalizer selection keys 663, 664, 665, and 666 for the No 6, No. 7, No. 8 and No. 9 totalizers, a "Subtract 6–9" key 667, a "Total 6–9" key 668, and a "Sub-Total" key 669. The left-hand bank of keys comprises a "Non-symbol" key 670, a "Reverse" key 671, and a "Non-select" key 672.

As shown in Figures 5, 7, and 8, the control keys in the right-hand bank are provided with studs 691 to 699 inclusive, which cooperate with slides or detents 700 to 705 inclusive, said slides being mounted for sliding movement in a forward and backward direction by means of four studs, bearing rollers and separating washers, secured to the partition plate 631. As shown in Figure 5 in connection with the stud 693, the inner ends of the studs are round in cross-section, while their outer ends are flat.

In a similar manner, the center bank of control keys are provided with studs 706 to 714 inclusive (Fig. 10), which cooperate with slides 715 to 720 inclusive, which are mounted for sliding movement on the right-hand side of the partition plate 632, as viewed from the front of the machine, in exactly the same manner as the slides 700 to 705, inclusive. The left-hand bank of control keys is likewise provided with studs 721, 722 and 723, which cooperate with three slides 724, 725 and 726, which are mounted for sliding movement on the right-hand side of the partition plate 633 by means of studs secured to the plate and bearing rollers, all as previously described in connection with the other two banks of keys.

The keys of each bank are adapted to be held in their depressed positions, against the urgency of their restoring springs 649, 650 and 651, by certain of the aforementioned slides in a manner similar to that employed in connection with the amount key banks. As shown in Figure 7, the slides 702, 703 and 705 are urged toward the front of the machine or to the right, as viewed in this figure, by springs 727, 728 and 729, respectively. The studs 691 and 692 on the "Balance 1" and the "Sub-Balance 1" keys 652 and 653 cooperate with the latching teeth on the slide 703, so that depression of either of these keys will result in their being latched in depressed position. Similarly, the studs 693, 694, 695 and 696 on the No. 2, No. 3, No. 4 and No. 5 totalizer selecting keys 654 to 657 inclusive, cooperate with latching teeth provided on the slide 702, so as to be retained thereby when depressed. The studs 697, 698 and 699 cooperate with latching teeth provided on the slide 705 so as to hold down the "Subtract 2–5," the "Total 2–5," and the "Credit Balance" keys 658—660 when they are depressed and also to enable each of these three keys flexibly to release one another.

Referring now to Figure 10, it will observed that the studs 706 and 707 on the "Add 1" and "Subtract 1" keys 661 and 662 in the middle bank of control keys are arranged to cooperate with latching teeth formed on the slide 717, which is urged toward the right by a spring 738, so as to cause these keys to be retained in their depressed positions and also to cause one of the keys to release the other.

The studs 708, 709, 710 and 711 cooperate with latching teeth formed on the slide 716, which is urged toward the right by a spring 739, and are thereby adapted to be flexibly latched in depressed position. To a like end, the studs 712, 713 and 714 on the "Subtract 6–9," the "Total 6–9," and the "Sub-Total" keys 667—669 are arranged to cooperate with the slide 720, which is urged toward the right by a spring 740.

Referring next to Figure 14 of the drawings, it will be noted that the keys of the left-hand control bank are adapted to be latched in their depressed positions by engagement of studs 721, 722, and 723 with the latching teeth formed on the slide 725, which slide is urged to the right, as viewed in Figure 14, by a spring 752 extending between the stud on the slide and a stud on the partition plate 633.

Manual key release

In order to enable the operator of the machine to release any of the amount, symbol, or function control keys before initiating an operation of the machine, a "Release" key 753 (Figs. 2, 16, 17, and 20) is mounted for vertical sliding movement on the left side frame 214 by means of a stud 754 in the side frame cooperating with a slot 755 in the lower end of the key stem and also by a pair of spaced guide studs 756 secured to the side frame and cooperating with a pair of parallel faces provided on the stem of the "Release" key 753. Depression of this key actuates a key release slide 761.

Means is also provided whereby depression of the "Release" key 753 will release any of the function control keys on the left-hand side of the key board which may have been depressed. The means for accomplishing this is shown in Figure 17. As shown here, the "Release" key is provided with a stud 781, cooperating with an arm of a lever 782 pivoted on a stud 783 mounted in the side frame 214 and urged counter-clockwise, as viewed in Figure 17, by means of a spring 784 which tends to urge the "Release" key into its raised position as shown in the figure. The lever 782 is provided with a camming face 785, which cooperates with a pin 786 mounted on the end of an arm 787 fast on a shaft 788, which is journalled in the partition plates 631, 632, and 633. Projecting from the left-hand side of the arm 787 is a stud 789, which, as shown in Figure 7, cooperates with projections formed on the slides 702, 703 and 705 for the right-hand bank of control keys. Consequently, when the "Release" key 753 is depressed, the lever 782 will be rotated clockwise, against the urgency of the spring 784, so as to cause the camming face 785 to cam the pin 786 to the left, as viewed in Figures 7 and 17, thus moving the slides 702, 703, and 705 toward the rear of the machine, so as to release any depressed control keys in the right-hand bank.

Referring now to Figure 9, there is also fast on the shaft 788 an arm 790, bearing a stud 793, which, as shown in Figure 10, cooperates with projections formed on the slides 716, 717 and 720 for the middle bank of control keys, so as to cause the slides to be moved rearwardly and the keys to be released when the "Release" key is depressed. As shown in Figures 12 and 14, the keys in the left-hand control bank will be released when the "Release" key 753 is depressed by virtue of an arm 794 secured to the shaft 788 and bearing a stud 795, which cooperates with a projection formed on the latching slide 725 for this row of keys.

Mechanism for releasing the function control keys near the end of the machine cycle is shown in Figures 20, 34, and 35 and consist of a slide 822 provided with elongated slots which cooperate with studs 823 and 824 secured to the side frame 214. The slide is urged toward the front of the machine by means of a spring 825 stretched between a stud on a pawl 826, pivotally mounted on a stud 827 on the slide, and a stud 828, mounted in the side frame 214. The slide is provided with a projection 829, which engages with the rear face of the stud 828 when the slide is in its forward position, thereby limiting the movement of the slide toward the front of the machine. Also pivoted on the stud 827 is an arm 830, the other end of which is fast on a hub 831 (Fig. 34) rotatably mounted on a stud 832, which is supported at one end by the left side frame 214 and at the other end by a bracket 833. This bracket is mounted on the left-hand side of the frame 214 by means of studs secured in said frame, to which the bracket is attached by means of screws 834 (Fig. 27).

The pawl 826 is provided with an upwardly-extending finger 835, which cooperates with a reduced portion of the hub 831, as shown in Figures 20, 34 and 35, and with a downwardly-extending finger 836, which cooperates with a stud 837 provided on the upper end of an arm 838 formed on a totalizer-engaging follower 839, which is pinned to a shaft 802. Also pinned to the shaft 802 near its left-hand end is an arm 840 (Fig. 23), which is similar to and moves with the arm 838 for the purpose of actuating the totalizer-engaging mechanism, which will be fully described later herein. The follower 839 is provided with a pair of rolls 841 and 842, which cooperate with cams 843 and 844, respectively (Fig. 23), mounted on the main cam shaft 253. Consequently, when the main cam shaft 253 is rotated through one complete revolution in a counter-clockwise direction as viewed in Figure 37, the shaft 802 will be rocked first clockwise, so as to cause the stud 837 to by-pass the pawl 826, and then counter-clockwise, so as to cause the stud to engage the downwardly-extending finger 836 of the pawl and move the slide 822 toward the rear of the machine near the end of the machine cycle (see line 3 of the time chart in Figure 44). Shortly before the shaft 802 reaches its completely restored position, as shown in Figures 35, the stud 837 will pass out of engagement with the downwardly-extending finger 836 and thereby allow the slide 822 to be moved toward the front of the machine under the influence of the spring 825 till the projection 829 contacts the stud 828.

The forward end of the slide 822 is provided with a hook portion 845 (Fig. 35), which engages with the pin 786 on the arm 787 fast on the shaft 788 (see also Fig. 17). It will be recalled that the arm 787 is provided with a stud 789, which cooperates with the latching slides 702, 703, and 705 (Fig. 7). It will also be recalled that arms 790 and 794 are secured to the shaft 788, which arms carry studs 793 and 795, respectively, which engage with the latching slides 716, 717, and 720, 725, respectively. Hence, when the slide 822 is moved toward the rear of the machine, the shaft 788 will be rotated clockwise, as viewed in Figure 35, so as to cause the studs 789, 793 and 795 to move the latching slides toward the rear of the machine and thereby release any depressed function control keys. When the slide is released at the end of the cycle, the latching slides for the function control keys will likewise be released and permitted to return to their initial positions under the influence of their individual springs. Hence, the function control keys will be automatically released near the end of the machine cycle in the same manner as the amount keys, and consequently the entire keyboard, with the exception of the date keys, will be cleared and ready for the next operation at the end of the machine cycle.

Key locking

Means is provided for locking up the entire keyboard of the machine the instant that the clutch is tripped and the machine cycle begun. The mechanism for accomplishing this includes an arm 875 (Fig. 8), which is secured to a shaft 282 just inside the right side frame 215, this arm being bifurcated at its upper end so as to engage a stud 876 provided in the lower end of an arm 877 secured on a key locking shaft 878, which is journalled in the framework of the amount keyboard. As the clutch is engaged and the machine cycle begun by the rocking of the shaft 282 in a counter-clockwise direction (as viewed in Fig. 43) under the urgency of a spring 285, the amount key locking shaft 878 will be rocked in a clockwise direction. The shaft 878 is provided with a series of lugs 879, each of which is flexibly connected with an extension 880 (Figs. 3A and 22), formed on a locking slide 891, by means of a spring 881. Accordingly, when the shaft 878 is rocked clockwise at the outset of the machine cycle, as explained above, the locking slide 891 for each bank of keys will be yieldably urged toward the rear of the machine by reason of the springs 881, so as to cause locking teeth 892 (Fig. 22) on the slides to move beneath studs 607 on the amount keys 589 and thus prevent the depression of any undepressed keys while the machine is operating. When the shaft 282 is restored in a clockwise direction toward the end of the machine cycle, the shaft 878 will be moved counter-clockwise, so as to move the locking slides forward and thus permit the keys which have been depressed to be returned to their raised positions when the latching slides are moved toward the rear of the machine, as previously explained herein.

Secured to the left-hand end of the shaft 878 is an arm 882 (Figs. 8 and 22) bearing a stud 883, which engages within a bifurcation provided in an arm 884 (see also Fig. 20) secured to the right-hand end of a short shaft 885 journalled in the left side frame 214. Secured to the left-hand end of the shaft 885 on the outside of the side frame is an arm 886, which is limited in its movements by means of a stud 887, which is secured to the side frame 214. On the lower end of the arm 886 is a stud 888, which engages with a bifurcated ear 889 (Figs. 7, 8 and 21) bent off from the locking slide 704. Hence, at the same time that the locking slide 891 (Fig. 22) is moved toward the rear of the machine so as to place the locking teeth 892 beneath the studs 607 on the amount keys, the locking slide 704 for the right-hand bank of control keys will be moved toward the front of the machine so as to place projections 890 beneath the studs 691 to 699 (Fig. 7) of those keys which are undepressed or over the studs on those keys which are depressed.

Forward movement of the slide 704 will also cause the "Release" key 753 to be locked against depression, this result being effected by means of a locking slide 893, which is mounted for sliding movement on the studs 756 by means of slots 894. The slide 893 is connected with the slide 704 for movement therewith by means of a stud 895 on the forward end of slide 704 which engages in a slot in the forward end of the slide 893. Hence, when the slide 704 moves forwardly, the slide 893 will move forward therewith, so as to place a shoulder 896, formed thereon, beneath a square stud 897 on the "Release" key 753 and thereby prevent depression of this key.

The bottom edge of the slide 893 also serves as a stop for a stud 898 in the stem of the "Release" key to thereby limit the upward movement of this key under the influence of the spring 784 (Fig. 17).

The locking slides 718 (Fig. 10) and 726 (Fig. 15) for the other two banks of control keys are tied to the slide 704 for movement therewith by means of a shaft 901 journalled in the partition plates 631, 632 and 633, to which shaft are secured arms 902, 903 and 904 (see Figs. 21, 10 and 15, respectively), which engage with bifurcations formed in the slides 704, 718 and 726. Thus, it will be seen that, when the clutch is tripped and the shaft 282 is rocked counterclockwise (Fig. 43), all the keys in the amount keyboard and the keys in the three control banks, as well as the "Release" key 753, will be restrained from further manipulation until the end of the machine cycle.

Differential actuators

The differential actuators 617 (Figs. 3A and 3B) are controlled by studs 605 attached to the stems of amount keys 589, which studs are adapted to engage with one of the shoulders 618 formed on the actuators 617 when a key is depressed, to thereby limit the rearward movement of the actuator.

Each actuator 617 is provided with a slot 911 for receiving a stud 912 mounted on a reducer arm segment 913, the rear edge of which is urged into engagement with a leading frame bar 915 by means of a spring 916 connected between the segment and the bar.

When the main cam shaft 253 is rotated through one revolution, cams 936 and 937 (Fig. 23) cause the leading frame bar 915 to be moved first toward the rear of the machine and then back to its original position, as shown in Figure 3B. Hence, the differential actuators 617 will be yieldably urged toward the rear of the machine by the springs 916 in the first half of the machine cycle and then positively restored to their home positions by means of the bar 915 in the second half of the cycle.

Totalizers—general

The machine shown in the present drawings is provided with ten add-subtract totalizers each having a capacity of 99,999,999.99. Referring to Figures 3B and 24, it will be observed that the totalizers are numbered from 1 to 9 inclusive and that the remaining totalizer, designated as the "X" totalizer, is located directly beneath the No. 1 totalizer. This totalizer is used in overdraft operations in a manner fully disclosed and claimed in copending application for Letters Patent of the United States, Serial No. 790,032, now United States Patent No. 2,626,749. The ten totalizers are similar in every respect, all of them being of the add-subtract type, and, since this particular type of totalizer has been fully disclosed in the United States Letters Patent No. 2,442,402, issued June 1, 1948, to John T. Davidson et al., it is believed that the following general description of the totalizers will be sufficient for a clear understanding of the present invention.

As shown in Figures 3B and 24, each of the totalizers is provided with a wheel 997 for each denominational order, each of the wheels being provided with twenty teeth and also having secured to one face thereof a tripping cam 998, said cam having a pair of diametrically opposed tripping teeth which cooperates with corresponding teeth on add tripping pawls 999 and subtract tripping pawls 1000. The totalizer wheels are rotatably mounted on a totalizer shaft 1001, which extends between the side arms of a totalizer supporting yoke 1002. Each of the arms is pivoted on a stud 1003 secured in partition plates 1011, which are supported on rods 1012 and 1013 extending between totalizer end frames 1004.

Each pair of end frames 1004—that is, the left-hand end frame and the right-hand end frame, between which the totalizer supporting yoke 1002 is pivotally mounted—are secured at their lower ends to a pair of footer bars 1005 and at their upper ends to a pair of header bars 1006. The footer bars 1005 are in turn secured by screws to the base 213, while the header bars 1006 are fastened together at their forward ends by a cross-bar 1015 (see Fig. 3B). In addition, the first pair of frame castings 1004 (see Fig. 3B) are screwed fast to the right and left side frames 214 and 215, with which the frame castings 1004 are in longitudinal alignment. Also, cross bars 908, 909 and 910 are secured at either end to the castings 1004. The totalizer wheels 997 are located in a co-planar relationship with respect to the actuators 617 and auxiliary actuators 907 and are adapted to be engaged with and disengaged from the rack teeth provided thereon in order to perform the various calculating functions of the machine.

*Totalizer engaging and disengaging mechanism*

Each of the totalizers is provided with a pair of engaging and disengaging cams for rocking its wheels into and out of engagement with the racks. The mechanism provided for this purpose is similar in every respect to the totalizer engaging and disengaging mechanism shown and described in the above-entitled Davidson patent, therefore, only a brief description of this mechanism will be given herein.

Referring now to Figure 24, on either end of the totalizer shaft 1001 are mounted rollers 1007, which engage in camming slots 1008 provided in cams 1009 secured to either end of a shaft 1010 journalled in the totalizer frame castings 1004. Secured to each shaft 1010 for the upper course of totalizers—that is, totalizers Nos. 1, 2, 4, 6, and 8—is an arm 1021 (see Fig. 25), to which is pivotally attached the rear end of a totalizer engaging link 1022, the forward end of which is slotted and engages with a grooved rod 1023 supported between the left side frame 214 and a bracket 804. The engaging shafts 1010 for the lower totalizers—that is, totalizers Nos. X, 3, 5, 7 and 9—have secured thereto bifurcated arms 1024, which engage with pins mounted in the lower ends of arms 1025, which are loosely pivoted on the shafts 1010 for the upper set of totalizers. Each of the arms 1025 has pivotally connected thereto the rear end of one of the totalizer engaging links 1022. It will thus be seen that for each totalizer there is provided a link 1022, half of these links being secured to the arms 1021 and the other half of the links being connected with the arms 1025.

Pivoted on a stud 1026 (Fig. 37), secured to the forward end of each of the totalizer engaging links 1022, is a totalizer engaging hook 1027, which cooperates with a totalizer engaging bar 1028. This bar is provided on either end with tenons whih are slidable in slots provided in the bracket 804 and in a frame plate 1029 (Fig. 37) attached to the left side frame 214. A pair of similar links 1030 and 1031 are secured at their rear ends to the bar 1028 and at their forward ends are pinned to the totalizer engaging arms 838 and 840, which are secured to the shaft 802. The totalizer engaging hooks 1027 are normally urged counter-clockwise about their studs 1026 by means of springs 1032, so as to cause studs 1033 (Figs. 28 and 37) on the hooks to be brought into engagement with the upper edge of the links 1022, thereby determining the normal or lowered position of the hooks.

Referring now to Figure 37, the companion cams 843 and 844 will cause the totalizer engaging bar 1028 to make four distinct movements on each cycle of operation of the main cam shaft 253. Two of these movements are made in an engaging direction and two in a return or disengaging direction, with a slight period of rest between each movement. In the first step of movement of the bar 1028 in an engaging direction or toward the front of the machine, the selected totalizer is engaged with the actuators in subtract, subtotal, and total-taking time; in the second movement of said engaging bar in the same direction, the selected totalizer is engaged in adding time; in the third movement of said bar 1028, which is now toward the rear of the machine, the selected totalizer is disengaged in subtract and total-taking time; and in the fourth and final movement of the bar back to home position, the selected totalizer is disengaged in adding and sub-total-taking time. By controlling the engagement and disengagement of the hook 1027 with and from the bar 1028, the totalizers may be engaged with and disengaged from the actuators at the proper time in the machine cycle to bring about the desired operation. The means for controlling the hooks 1027 so as to cause the totalizers to be engaged with and disengaged from the racks at the proper time to cause these various types of calculating operations to be performed will be described in a later section of this description.

*Totalizer control mechanism—general*

Located beneath the function control keys 652–672 are a plurality of totalizer control members or slides for determining the time of engagement and disengagement of the totalizers with and from the actuators. As shown in Figures 9 and 29, there are eight identical slides or control members 1051 for totalizers 2 to 9 inclusive, which slides are mounted for longitudinal sliding movement on grooved sleeves 1052 mounted on the bolts 646. Each of the slides 1051 is urged toward the front of the machine by means of a spring 1053 secured at one end to the slide and at the other end to one of a group of rods 1054 extending between the partition plates 631, 632, and 633 (see Figs. 9 and 11). The slides, however, are normally prevented from moving toward the right under the urgency of their springs by a series of totalizer control levers 1056 (Fig. 27) (one for each slide) bearing studs 1055, which engage with slots 1057 provided in the rear ends of the slides 1051. The levers 1056 are loosely pivoted on the shaft 1058, which is supported between the bracket 804 and the left side frame 214, and each lever is provided with a rearwardly-extending finger 1059, which is adapted to cooperate with a tail 1050 (Fig. 28) provided on each of the totalizer engaging hooks 1027. When the parts are in their home positions, as shown in Figs. 27 and 28, the fingers 1059 are supported by a bail 1060 secured between arms 1061 and 1062 pinned to the shaft 1058. The arm 1062 is pivotally connected with the upper end of a link 1063, the lower end of which is pivotally connected with a follower arm 1064 rotatably mounted on the shaft 802. The arm 1064 is provided with a roll 1065, which bears against the periphery of a plate cam 1066 secured to the cam shaft 253. As the cam shaft rotates in a counterclockwise direction, as viewed in Fig. 27, the bail 1060 will be lowered so as to permit the springs 1053 to move the slides 1051 forward in the machine and thus move the fingers 1059 down into engagement with the tails 1050 on the hooks 1027. Toward the end of the machine cycle, the cam 1066 will cause the bail 1060 to be restored to its home position, thus positively restoring the slides 1051 and permitting the hooks 1027 to be returned by their springs into their normal positions, as shown in Fig. 28. The exact time in the machine cycle when the bail 1060 releases and restores the levers 1056 may be determined from the time chart shown in Fig. 44 (line 5).

The type of operation to be performed in any of the totalizers of the present machine—viz., Add, Subtract, Total, or Non-add—is determined by the distance through which its associated totalizer control slide is permitted to move. These slides are controlled in their movements toward the front of the machine when the latter is cycled either by the carriage stops mounted on the travelling carriage or by the group of function control keys located on the left-hand side of the keyboard. The means by which the control keys control the movement of the totalizer control slides will be described next, while the mechanism controlled by the travelling paper carriage for determining the extent of movement of the control slides will be fully described in a later section.

*Control mechanism for No. 1 totalizer*

As shown in Figs. 27 and 28 of the drawings, a No. 1 totalizer control slide 1067 (see also Figs. 29 and 31) is coupled with one of the levers 1056 by means of a stud 1055, as described earlier herein. The No. 1 totalizer slide 1067 is similar to the slides 1051 for the remaining totalizers except for the fact that the forward end of this slide is provided with a built-up portion, as shown in Fig. 31, for cooperating with studs on a group of function control keys for the No. 1 totalizer. The parts are shown in Fig. 28 in the positions which they occupy when the machine is at rest, the finger 1059 being held out of engagement with the tail 1050 on the hook 1027. If the machine is now operated without depressing any one of the four function control keys 652, 653, 661, and 662 for the No. 1 totalizer, the slide 1067 will be free to move all the way forward in the machine until it is stopped by engagement of the roll 1065 with the low portion of the cam 1066. This movement of the slide 1067 will cause the finger 1059 to be moved to its lowermost or "Non-add" position (as indicated in dot-and-dash lines in Fig. 28) and thus elevate the hook 1027 to its highest position. When the totalizer engaging bar 1028 is now moved forward in accordance with the timing shown in the time chart illustrated in Fig. 44 (line 3), the hook 1027 will lie out of the path of the bar 1028 and the No. 1 totalizer will remain disengaged from the racks during the entire machine cycle. Thus, although an amount may have been set up on the amount keys and printed on the record material, it will not be entered in the No. 1 totalizer, since this will be a non-add operation as far as the No. 1 totalizer is concerned. However, if the "Add 1" key 661 is depressed by the operator prior to the initiation of the machine cycle, a long stud 1068, mounted on the key, as shown in Figs. 29 and 31, will be lowered into the path of a lug 1069 provided on the forward end of the slide 1067 so as to stop the slide with the finger 1059 in such a position as to hold the hook 1027 in an intermediate position, in which a heel 1070 formed on the hook 1027 will lie in the path of the engaging bar 1028. Thus, during the first movement of the bar 1028 in a forward direction, the bar will pass idly beneath a nose 1081 on the hook, and the totalizer will remain disengaged from the actuators. After the actuators have completed their rearward movement in the machine, the engaging bar 1028 will be given a second step of movement in a forward direction and will engage the heel 1070 and move the totalizer engaging link 1022 forward. This will cause the totalizer engaging cam 1009 to rock the totalizer into engagement with the actuators shortly before the middle of the cycle. In the first part of the second half of the machine cycle, the bar 1028 will be moved rearwardly, as indicated in the time chart, but this will be an idle movement, since the nose 1081 of the hook is elevated above the bar 1028. Near the end of the machine cycle, after the actuators have moved forward to their home positions, the bar 1028 will be given its final step of movement in a rearward direction and will engage with a shoulder 1082 provided on the link 1022, thereby moving the link rearwardly and disengaging the totalizer from the actuators. Since, in the above operation, the No. 1 totalizer was engaged with the actuators during their return movement in the second half of the machine cycle, any amount set up on the amount keys 589 will be entered additively in the No. 1 totalizer.

In order to control the No. 1 totalizer in subtract operations, the "Subtract 1" key 652 is provided with a long stud 1083, which overlies the forward end of the No. 1 totalizer selector slide 1067. When the key 662 is depressed, the stud 1083 is moved into the path of a shoulder 1084 on the slide 1067, so as to permit only a slight forward movement on the slide under the influence of its spring during the machine cycle. The shoulder 1084 is so located on the slide as to stop the finger 1059 in the highest dot-and-dash position shown in Fig. 28. In this position, the finger is out of engagement with the tail 1050, and the engaging bar 1028 will engage with the nose 1081 of the hook 1027 and move the link 1022 forwardly so as to engage the No. 1 totalizer with the actuators at the very outset of the machine cycle. Thus, the totalizer wheels will be in engagement with the actuators when the latter are moved rearwardly in the first half of the machine cycle, so as to cause the amount set up on the keys 589 to be entered subtractively into the totalizer wheels. At the same time, a transfer control link 1034 (Fig. 25) for the No. 1 totalizer will be prevented from moving forward in the machine far enough to cause a subtract control hook 1037 to be disengaged from a stud 1040, and consequently a subtract control shaft 1042 for the No. 1 totalizer will be rocked and the transfer mechanism will be conditioned for subtraction.

In order to disengage the hook 1027 from the bar 1028 prior to the second step of movement of the bar, a pitman 1085 (see Figs. 36, 37, and 38) is provided for operating the hook 1027. As shown in Fig. 38, there are as many pitmans 1085 as there are totalizers, and each pitman is provided with upper and lower bifurcations (Fig. 37) which engage with rods 1086 and 1087, respectively, the rod 1086 being supported between the bracket 804 (Fig. 25) and the frame plate 1029 (Fig. 37), while the lower rod 1087 is carried between a pair of identical arms 1088 (Figs. 37 and 38) pivotally mounted on a rod 1089 supported between the bent-up side walls of the bracket 641 (Figs. 39 and 40). The arms 1088 are connected together at their outer ends by means of a rod 1090, to which are attached the upper ends of springs 1091, the lower ends of which are fastened to lugs on each of the pitmans 1085. The pitmans are thus urged upwardly so as to cause the bottoms of the lower bifurcations thereon to engage against the rod 1087. On each pitman, near its upper end, is provided a short stud 1092, which overlies the tail 1050 formed on its associated hook 1027.

The pitmans 1085 are adapted to be reciprocated on each cycle of the main cam shaft 253 in accordance with the timing given in line 4 of the time chart (Fig. 44). The means for reciprocating the pitmans 1085 is shown in Fig. 36 and consists of a cam follower 1093 provided with a bifurcation which engages with the rod 1087. The cam follower is loosely pivoted on the shaft 802 and is provided with rolls 1094 and 1095, which cooperate with a pair of companion cams 1096 and 1097, respectively, secured to the main cam shaft 253.

As shown in the time chart, the pitmans 1085 are moved downwardly by the cams 1096 and 1097 during the time that the engaging bar 1028 is at rest after its first step of movement in a forward direction. Hence, in a subtract operation, after the totalizer wheels have been moved into engagement with the actuators in the first part of the machine cycle, the stud 1092 on the pitman 1085 for the No. 1 totalizer will move the hook 1027 out of engagement with the bar 1028 and will hold it out of engagement therewith while the bar makes its second step of movement in a forward direction near the end of the first half of the machine cycle. Immediately after the bar 1028 completes its second step of movement in a forward direction, the pitman 1085 will be elevated so as to permit the hook 1027 to engage over the bar and thus cause the totalizer wheels to be moved out of engagement with the actuators when the bar 1028 receives its first step of movement in a rearward direction at the beginning of the second half of the cycle. After the bar 1028 has completed its first step of movement in a rearward direction so as to disengage the totalizer wheels, the pitman 1085 will again be moved downwardly so as to again disengage the hook 1027 from the bar 1028 during the second step of movement of the bar in a rearward direction. After the bar 1028 has completed its second and final step of movement in a rearward direction, the pitman 1085 will again be moved upwardly so as to release the hooks 1027, thus restoring the parts to their normal positions, as shown in Fig. 37.

In total-taking or balance operations, the No. 1 totalizer control slide 1067 will be stopped by a stud 1098 (Fig. 31) secured to the stem of the "Balance 1" key 652, which stud cooperates with a shoulder 1099 on the slide so as to cause the finger 1059 (Fig. 28) to be positioned just above the location which it assumed for the adding operation hereinbefore described. It will be noted that, when the finger is in this position, it does not lift the nose of the hook 1027 above the bar 1028, and the sequence of operations in this case is the same as for a subtract operation. In other words, on the first step of movement of the bar 1028, the totalizer is moved into engagement with the actuators, after which the hook 1027 is moved out of engagement with the bar 1028 by means of the pitman 1085 associated therewith. The bar 1028 then receives its second step of movement, after which the pitman releases the tail of the hook and permits it to re-engage with the bar. Hence, when the bar receives its first step of movement in a return direction, shortly after the middle of the cycle, the totalizer will be moved out of engagement with the actuators. The hook 1027 is then elevated out of engagement with the bar 1028 by means of the pitman 1085, and the bar is permitted to return idly to its initial position at the end of the machine cycle. The totalizer will thus be engaged with the actuators in the first half of the machine cycle when the latter are moved rearwardly and thereby cause the totalizer wheels to be reversely rotated until they are stopped in zero position by the engagement of the tripping cams 998 (Fig. 24) thereon with the back side of the add tripping pawls 999. The total is then printed on the record material, after which the totalizer is disengaged from the actuators and remains disengaged therefrom while they are being returned to their home positions during the second half of the machine cycle. Thus, the amount standing on the totalizer wheels is removed therefrom, and the wheels are left in their zero positions at the end of the cycle.

Means is also provided for causing a sub-total operation to be performed; i. e., the totalizer wheels are engaged with the actuators at the beginning of the cycle and maintained in engagement with them until the end of the cycle. The means for accomplishing this result will be fully set forth in a subsequent section of this description.

*Control mechanism for No. 2–No. 9 totalizers*

As hereinbefore described, the No. 1 totalizer slide 1067 is controlled by studs mounted on the stems of the No. 1 control keys, as shown in Figs. 29 and 31. In a similar manner, the totalizer control slides 1051 for totalizers No. 2 to No. 9 are controlled by the control keys 654 to 659 and 663 to 669 for these totalizers. As illustrated in Figs. 9 and 29, each of the slides 1051 is provided on its upper edge with a lug 1100, which is adapted to cooperate with a mechanism attached to the stem of each of the control keys for controlling the positioning of the slide. The mechanism for controlling totalizer No. 2, No. 3, No. 4, and No. 5 is shown in Figs. 4, 5, and 8. As shown therein, a long stud 1101 is secured on the left-hand side of each of the key stems for the totalizer selecting keys 654, 655, 656, and 657, the left-hand ends of these studs being received within vertical slots provided in the partition plate 632 (Fig. 29). As shown in Figs. 5 and 29, the studs 1101 are provided with flattened surfaces 1102 for stopping the lugs 1100 in a manner to be described hereinafter. Pivotally mounted on each of the studs 1101 are a subtract yoke or auxiliary setting member 1103 and a total yoke or auxiliary setting member 1104, these yokes being provided at their inner ends with upstanding arms carrying studs 1105 and 1106, respectively. Each of the studs 1105 is received within one of a series of bifurcations provided along the lower edge of a subtract plate 1111 (Fig. 8). This plate is provided at either end with slots by means of which the plate is slidably mounted on screws 1112 secured to the partition plate 631. The studs 1106 engage with bifurcations provided in the lower edge of a total plate 1113, which is slidably mounted on the screws 1112 adjacent to the plate 1111. The plates 1111 and 1113 are provided with camming surfaces 1114 and 1115 (Fig. 4), respectively, which cooperate with studs 1134 and 1135 on the stem of the "Subtract 2–5" key 658 and the "Total 2–5" key 659, respectively. Each of the plates 1111 and 1113 is biased toward the front of the machine by springs, so as normally to maintain the yokes 1103 and 1104 in a slightly elevated position, as shown in Fig. 4. However, when the "Subtract 2–5" key is depressed, the plate 1111 will be cammed toward the rear of the machine, thereby lowering the yoke 1103 into a substantially horizontal position. Similarly, when the "Total 2–5" key is depressed, the plate 1113 will be cammed toward the rear of the machine, thereby lowering the yoke 1104 into an approximately horizontal position.

A similar mechanism is provided for the No. 6, No. 7, No. 8, and No. 9 totalizer selecting keys. As shown in Figs. 9 and 11, each of the key stems of the aforementioned keys has secured thereto a long stud 1116, which extends across the slides 1051 for the No. 6, No. 7, No. 8, and No. 9 totalizers and is received at its lefthand end in a vertical slot provided therefor in the partition plate 633. Rotatably mounted on each of the studs 1116 are a subtract yoke 1117 and a total yoke 1118, these yokes having upstanding arms provided with studs 1119 and 1120, respectively. A subtract plate 1121 and a total plate 1122 are slidably mounted on screws 1123 secured to the partition plate 632 and are provided on their lower edges with bifurcations engaging with the studs 1119 and 1120, respectively. The plates 1121 and 1122 are provided with camming surfaces 1124 and 1125, respectively, which are urged into engagement with studs 1132 and 1133 mounted in the stems of the subtract key 667 and the total key 668, respectively, by means of springs 1126 (only one shown).

The operation of the above described yoke mechanism on the control keys for the No. 2, No. 3, No. 4, and No. 5 totalizers is exactly the same as that on the keys for the No. 6, No. 7, No. 8, and No. 9 totalizers, and therefore only the operation of the mechanism for the last mentioned group of keys will be described herein. When one of the totalizer selecting keys 663 to 666, inclusive, is depressed, the stud 1116 thereon will be carried downwardly into the path of the lug 1100 on the corresponding totalizer slide 1051. When the machine is operated and the slides 1051 are released, as previously described, the slide for the totalizer corresponding to the depressed key will move forwardly in the machine until the lug 1100 thereon strikes against the flattened surface on the stud 1116, thereby moving the finger 1059 on the totalizer selecting lever 1056 down to the "add" position, as shown in Fig.

28. Accordingly, when any one of the keys 663 to 666 is depressed alone, the totalizer corresponding thereto will be selected for addition. In the case of those keys which are not depressed, there will be nothing to stop the related slides 1051, and they will therefore move all the way forward in the machine, so as to cause the fingers 1059 to move to their "Non-add" positions, as shown in Fig. 28. However, if the "Subtract 6-9" key 667 is depressed in conjunction with one of the totalizer selecting keys, the yoke 1117 on the depressed totalizer selecting key will be rocked down into the path of the lug 1100 on the related control slide 1051, and, when the machine is cycled, the slide will be stopped after it has moved a short distance forward. The finger 1059 will thus be moved to the "Subtract" position, shown in Fig. 28, so as to cause a subtraction operation to be performed in the selected totalizer. Similarly, when the "Total 6-9" key 668 is depressed in conjunction with one of the totalizer selecting keys, the total yoke 1118 on the depressed totalizer selecting key will be lowered into the path of the lug 1100 on the corresponding totalizer slide to thereby stop the slide in the total position and so cause the finger 1059 to be located in the "Total" position, shown in Fig. 28.

It is to be noted that the depression of either the "Subtract 6-9" key or the "Total 6-9" key alone will cause the yokes to be rotated about the studs on the keys but that they will be ineffective to engage one of the lugs 1100 until one of the totalizer selecting keys 663 to 666 has been depressed to bring them into effective position. Thus, when either one of the keys 667 or 668 is depressed, all of the yokes connected therewith will be rotated, but only the yoke carried by the depressed totalizer selecting key will be effective to stop the slide 1051 associated with that key.

As shown in Fig. 29, a totalizer control slide 1127 is provided for the "X" totalizer. This slide is similar to the slides 1051 but is not provided with a lug 1100, since no provision has been made for selecting the "X" totalizer from the keyboard of the machine. As previously mentioned herein, this totalizer is customarily reserved for use as a storage totalizer during overdraft operations and is therefore not ordinarily available for use as an accumulating register. However, if it should happen that in a particular application of the machine the printing of credit balances is not desired, the "X" totalized may be selected for use in the same manner as the other totalizers of the machine under the control of the travelling paper carriage and so provide a machine having ten totalizers available for receiving add or subtract items. The slide 1127 for the "X" totalizer, therefore, has no function as far as the selection of this totalizer for add, subtract, total, or sub-total operations is concerned, but has only the function of controlling certain parts of the machine during negative total-taking operations, as is fully described in co-pending application, Serial No. 790,032, now United States Patent No. 2,626,749.

*Total-taking controls*

In total-taking operations, it is necessary that zero stop pawls 614 (Fig. 3A) be moved so as to release the differential actuators 617 for rearward movement, so as to rotate the totalizer wheels 997 in a reverse direction until they are stopped by the tripping cams 998 (Fig. 24) on the wheels engaging with the add tripping pawls 999 to thereby position the differential actuators and printing sectors 942 in accordance with the amount standing on the totalizer wheels. In adding and subtracting operations, the zero stop pawls 614 are removed by depression of the amount keys 589, which cause the studs 607 thereon to cam control slides 611 forwardly and thereby rotate the zero stop pawls out of engagement with blocks 616. In total-taking operations, however, no amount keys are depressed, and it is therefore necessary to provide other means for releasing the actuators from the zero stop pawls. This is accomplished in the machine illustrated herein by providing means for moving the key release slide 761 (Fig. 16) toward the rear of the machine at the outset of the machine cycle, thereby causing a stud 764 on the slide to rock a shaft 766 clockwise, as viewed in Figure 16, so as to cause a stud 768 mounted in each of arms 769 to act against a cam face 1128 (Fig. 3A) provided on each of the control slides 611, thereby moving the slides forwardly and releasing the zero stop pawls 614. At the same time, the studs 768 will cooperate with cam projections 767 provided on latching slides 609 in the amount key banks so as to release any amount keys which may have been accidentally depressed prior to the initiation of the total-taking cycle and thereby prevent the square studs 605 on the key stems from coacting with the shoulders 618 on the differential actuators to stop the actuators in positions other than those dictated by the amounts standing on the totalizer wheels.

The actuation of the key release slide 761 near the beginning of the machine cycle rather than near its end, as in normal operations, is accomplished by means of the mechanism shown in Figure 20. As shown in this figure, a key release latch 1129 is pivotally mounted on a stud 1130 mounted on the rear end of the slide 761. The rear end of the latch is formed with a hook 1131, which engages with a stud 1141 mounted in a depending arm of a lever 1142 pivotally mounted on a stud 1143 secured to the left side frame 214. The lever 1142 is also provided with a bifurcated arm which engages with a stud 1144 mounted in an arm of a bell crank lever 1145, which is loosely pivoted on the shaft 802. The other arm of the bell crank lever is provided with a roll 1146, which cooperates with the periphery of a plate cam 1147 secured to the main cam shaft 253. Hence, when the cam shaft 253 rotates in the direction of the arrow, the lobe on the cam 1147 will rock the bell crank 1145 and the lever 1142 in the early part of the machine cycle so as to move the stud 1141 toward the rear of the machine and cause the key release slide 761 to be operated for the purpose mentioned above.

In order to prevent the above-described early key release from occurring in adding and subtracting operations, the totalizer selecting slides 1051 for totalizers No. 2 and No. 9 inclusive, the slide 1067 for the No. 1 totalizer, and the slide 1127 (Fig. 29) for the "X" totalizer are provided on their lower edges with abutments 1148, which are arranged to overlie a bail 1149 (Fig. 18) when the slides are located in their total-taking positions. The bail 1149 is secured at either end to a shaft 1150 (Figs. 39 and 40), which shaft is journalled at either end in the side walls of the bracket 641. Also pinned to the shaft 1150, near its center, is an arm 1151, on which is mounted a stud 1152, which is received within an elongated slot provided in a slide member 1153. The slide member 1153 is slidably supported on the stud 1152 and also on a rod 1154 extending between the sides of the bracket 641 and is provided with a rearwardly-extending tail 1155, which abuts against a stud 1156 secured to an arm 1157 loosely pivoted on the shaft 802. The arm 1157 is provided at its lower end with a roll 1158, bearing against the periphery of a plate cam 1159 secured to the main cam shaft 253.

The right-hand end of the bail 1149 has formed thereon a depending arm 1160 (Fig. 18), on the lower end of which is mounted a stud 1161, to which is fastened one end of a spring 1162, the other end of which is secured to a stud mounted in the bracket 641. The spring 1162, together with other similar springs to be described later, urges the slide 1153 toward the rear of the machine and forces the tail 1155 thereon into contact with the stud 1156 on the arm 1157. Consequently, when the cam 1159 is rotated in the direction of the arrow shown in Figure 40, the low portion of the cam will move under the roll 1158, and the slide 1153 will be permitted to move toward the rear of the machine under influence of the springs 1162, etc.

This will allow the shaft 1150 to be rotated clockwise, as viewed in Figure 40, under the urgency of the spring 1162 and thereby cause a stud 1163 (Figs. 16 and 18), mounted in an arm 1164 pinned to the right-hand end of the shaft 1150, to rotate the key release latch 1129 counter-clockwise, as viewed in Figure 16, thereby uncoupling the hook 1131 from the stud 1141 and so prevent early release of the amount keys. However, if any of the totalizer control slides are located with their abutments 1148 positioned above the bail 1149, clockwise rotation of the shaft 1150 will be prevented, and the key release latch 1129 will remain coupled to the stud 1141 so as to bring about an early release of the amount keys.

It will be recalled that, in total-taking operations, the totalizer wheels are disengaged from the actuators near the middle of the machine cycle. At this time, the leading frame bar 915 (Fig. 3B) is in its rearmost position, and the springs 916 are placed under tension, thereby urging all of the actuators toward the rear of the machine. However, the actuators are restrained from rearward movement by engagement of the tripping cams 998 on the totalizer wheels with the add tripping pawls 999. In order to prevent the actuators from being snapped suddenly to the rear by the springs 916 when the totalizer wheels are disengaged near the middle of the machine cycle, a series of rack control pawls 1165 (Figs. 3A, 18 and 19) are provided, which cooperate with ratchet teeth 1171 formed on the lower side of each of the actuators 617 and so prevent the actuators from moving rearwardly when the totalizer wheels are disengaged. The pawls 1165 are freely pivoted on a rack control pawl shaft 1172 extending between the side frames 214 and 215 of the machine frame. Each of the pawls is urged into engagement with a rod 1173 by means of a spring 1174 (Fig. 19) connected between the pawl and the rod. The rod 1173 is supported between a pair of identical arms 1175, which are secured to the shaft 1172, which is rocked counter-clockwise, as viewed in Figures 18 and 19, prior to the disengagement of the totalizers in a total-taking operation. The means for rocking the shaft 1172 is shown in Figure 18 and consists of a three-armed lever 1176, which is pinned to a shaft 813 and is provided with an upstanding arm 1177, which is urged into engagement with a stud 1178 on a lever 812 by means of a spring 1179, which is stretched between a stud on the lever 812 and a stud on the lever 1176. Also pinned to the shaft 813, just inside the left side frame 214, is an arm 1180, which is pivotally connected to one end of a link 1181, which is freely pivoted at its opposite end to an arm 1182, which is pinned to the shaft 1172. Hence, when the lever 812 is rocked clockwise, as viewed in Figures 16 and 18, by plate cams 796 and 797, the spring 1179 will urge the shaft 813 to move with the lever 812 and thereby cause the toggle consisting of the arm 1180 and the link 1181 to be straightened. This will cause the arm 1182 to be raised and the shaft 1172 to be rocked counter-clockwise, thereby raising the rod 1173 and urging the pawls 1165 into engagement with the ratchet teeth 1171. The actuators 617 will thus be prevented from moving rearwardly in the machine when the totalizer wheels are disengaged therefrom, though they may be moved toward the front of the machine without any interference by the pawls 1165, since in this case the teeth 1171 will ratchet over the pawls, which are yieldably held in engagement therewith by the springs 1174.

In the case of operations other than total-taking operations, means is provided for preventing the pawls 1165 from engaging with the actuators, since such engagement would be both useless and undesirable. The mechanism for accomplishing this is shown in Figure 18 and consists of a blocking slide 1183, which is slidably mounted at its left-hand end on a stud 1184 mounted in the bracket 641 at its right-hand end on a stud 1185, which is mounted in a downwardly-extending portion of the arm 1164. The slide 1183 is urged against the stud 1185 by means of a spring 1186, which is stretched between the latter stud and a stud on the slide 1183. Whenever an abutment 1148 on one of the totalizer control slides lies above the bail 1149, the blocking slide 1183 will remain in the position shown in Figure 18 and hence will not interfere with the movement of the rack control pawls 1165 into engagement with the ratchet teeth 1171 on the actuators. However, if an operation other than a total-taking operation is to take place, there will be no abutment located above the bail 1149, and hence the shaft 1150 will be rocked clockwise by the spring 1162, and the blocking slide will move under an ear 1187 formed on a rearwardly-extending arm of the three-armed lever 1176. This lever will thus be prevented from following the movement of the lever 812, and hence the rack control pawls will remain in their lowered positions out of engagement with the ratchet teeth 1171.

As may be seen from lines 1 and 2 of the time chart shown in Figure 44, the actuators will be fully restored to their home positions before the rack control pawls are moved out of engagement with the ratchet teeth thereon. However, as shown by line 7 of the time chart, the cam 1159 will attempt to restore the blocking slide 1183 earlier in the cycle than the rack control pawls and therefore attempt to move the slide out from under the ear 1187 on the three-armed lever 1176. If this were allowed to occur, the pawls 1165 would be snapped up into engagement with the ratchet teeth 1171, and these teeth would ratchet over the pawls during the latter part of the restoring movement of the actuators. This phenomenon is prevented by the provision of a lip 1188 on the blocking slide, which will engage with the ear 1187 and prevent further movement of the slide, the spring 1186 being stretched as the stud 1185 continues its restoring movement toward the right (Fig. 18). The lever 1176 will therefore remain blocked by the slide until the lever 812 is restored and the ear 1187 lifted off of the lip 1188 so as to permit the slide to be returned by spring 1186 to the position shown in Figure 18.

*Sub-total-taking control mechanism*

Provision is made in the present machine for taking a sub-total from any of the totalizers except the "X" totalizer under the control of the totalizer control keys mentioned above. For this purpose, a "Sub-balance 1" key 653 is provided for controlling the taking of a sub-total from the No. 1 totalizer, and a "Sub-total" key 669 is provided for controlling the taking of a sub-total from any of the totalizers No. 2 to No. 9. In the case of the latter key, the totalizer selection key for the desired totalizer must be depressed along with the appropriate total key 659 or 668 and the sub-total key 669. As shown in Figures 33, the keys 653 and 669 cooperate with a sub-total control slide 1190, which is slidably mounted on the bolts 646 in the same manner as the totalizer control slides. The slide 1190 is urged forwardly in the machine by means of a spring 1191 but is restrained from movement, except during cycling of the machine, by means of the bail 1060 cooperating with a lever 1192, which is similar to the levers 1056 associated with the totalizer control slides, except that the finger 1059 is omitted therefrom. The lever 1192 bears a stud 1193, which cooperates with a slot formed in the rear end of the slide 1190 in a manner as previously described in connection with the totalizer control slides.

During the cycling of the machine, the bail 1060 will be lowered and the slide 1190 will be permitted to move toward the front of the machine under the influence of the spring 1191. If neither of the keys 653 or 669 is depressed, the slide will be free to move its maximum distance to the right, whereas, if either of the aforementioned keys is depressed, the slide will be permitted to move only a short distance before it will be stopped by studs 1194 and 1195 mounted on the stems of the keys 653 and 669, respectively, abutting against shoulders 1201 and 1202, respectively, formed on the slide.

The lower edge of the slide 1190 is provided at its rear end with a cut-away portion 1203, which cooperates with a bent-over ear 1204 formed on an arm 1205 of a bail 1206. This bail is journalled on a rod 1207, which is supported between the bent-up side walls of the bracket 641 (see also Figures 39 and 40).

The bail 1206 is controlled by an arm 1208, which is loosely pivoted on the rod 1207 and is urged toward the rear of the machine by a spring 1209. The arm is prevented from moving under the influence of the spring 1209, however, by means of a stud 1210 mounted on the slide member 1153, which cooperates with the arm to hold it in the position shown in Figure 40. However, when the machine is cycled and the slide member is permitted to move toward the rear of the machine, the arm 1208 and the bail 1206 will be rotated clockwise about the rod 1207 and thereby urge the ear 1204 into engagement with the under side of the slide 1190.

Also loosely pivoted on the rod 1207 is a series of arms 1211 (see also Fig. 37), each provided with a bentover ear 1212, which is adapted to cooperate with the under side of one of the slides 1051, 1067, and 1127. Pivotally connected to each of the arms 1211 are links 1213, which are bifurcated at their left-hand ends so as to slide upon the rod 1154. Each of the links 1213 is urged toward the left, as viewed in Figure 37, by means of a spring 1214 stretched between the link and a rod 1215 supported between the side walls of the bracket 641. This causes a finished surface 1216 on the arms 1211 yieldingly to be pressed into engagement with the forward edge of the bail 1206.

In all operations other than sub-total-taking operations, the slide 1190 will receive its full movement to the front of the machine and so cause a surface 1217 thereon to be moved over the ear 1204 on the arm 1205, thereby preventing clockwise rotation of the bail when the machine is cycled. Each of the arms 1211 associated with the totalizer control slides will be prevented from rotating clockwise by reason of the engagement of the surface 1216 thereon with the bail 1206. However, when one of the keys 653 or 669 is depressed, the slide 1190 will be prevented from moving far enough toward the front of the machine to enable the surface 1217 to move above the ear 1204. Thus, the bail 1206 will be permitted to rock clockwise when the machine is cycled, thereby releasing each of the arms 1211 for similar movement under the urgency of their springs 1214. However, as shown in Figure 37, the arms will be individually blocked by the lower edge of the totalizer control slides except in those cases where the slides have been permitted to move to a total-taking control position where a notch 1218 will be positioned above the ears 1212. Thus, when a total key has been depressed so as to cause the selected totalizer control slide to be positioned with its notch 1218 located above one of the ears 1212 and the sub-total key has been depressed so as to enable the bail 1206 to move away from the finished surface 1216, the associated link 1213 will be permitted to move toward the left, as viewed in Figure 37, and thereby cause a finger 1219 formed thereon to be moved against the face of a bent-over ear 1220 formed on each of the pitmans 1085. Thus, when this particular pitman is moved down during the operation of the machine, the finger 1219 will be moved above the ear 1220 by the spring 1214. The pitman 1085 will thus be held in its lowered position throughout the balance of the machine cycle, as indicated in line 4 of the time chart, thereby maintaining the totalizer engaging hook 1027 in an elevated or inactive position. Hence, in a sub-total-taking operation, the totalizer will remain engaged with the actuators throughout the entire machine cycle instead of being disengaged therefrom shortly after the middle of the cycle. As a result, any amount standing on the totalizer wheels will be printed and then run back into the wheels, thereby constituting a sub-totalling or reading operation.

As pointed out above, it is necessary in a sub-total-taking operation to depress the appropriate total key 659 or 668 in order properly to position the totalizer control slide 1051 and also to depress the "Sub-total" key in order to release the bail 1206 for clockwise movement. In the case of the No. 1 totalizer, however, the "Sub-balance 1" key 653 is provided with a toe 1221 (Fig. 4), which overlies a foot 1222 formed on the lower end of the "Balance 1" key 652. Thus, when the key 653 is depressed, it will carry down with it the "Balance 1" key, thereby causing the No. 1 totalizer control slide 1067 (Fig. 31) to be properly positioned and at the same time causing the sub-total control slide 1190 to be blocked by the stud 1194 (Fig. 33) after it has moved a short distance forward.

It should be noted that it is possible to take a total from any of the totalizers of the group No. 2 to No. 5 or of the group No. 6 to No. 9 and to transfer such total either additively or subtractively into any of the totalizers of the other group. It is also possible, through the use of the No. 1 totalizer control keys, to enter such totals either additively or subtractively into the No. 1 totalizer. Similarly, a total taken from the No. 1 totalizer may be entered either additively or subtractively into any one of the totalizers No. 2 to No. 5 and also into any one of the totalizers No. 6 to No. 9 by simple depression of the proper control keys.

In certain instances, it may be desirable to list a large number of items in the No. 1 totalizer. In this case it would be undesirable for the operator to have to depress the "Add-1" key for each item entered. In order to avoid this, a special stay-down key latch 1223 is pivotally mounted at 1224 on an upstanding ear bent off from the retaining strip 637 (Fig. 9), said latch having a notch 1225 provided in its lower end which is adapted to cooperate with a stud 1226 on the stem of the "Add-1" key 661. Thus, the "Add-1" key may be permanently latched down by depressing the key and then manipulating the latch so as to place the notch 1225 over the stud 1226. It is also to be noted that the "Subtract-1" key will take precedence over the "Add-1" key, inasmuch as the stud 1083 (Fig. 31) on the "Subtract-1" key will strike against the shoulder 1084 on the No. 1 totalizer control slide 1067 before the stud 1068 on the "Add-1" key will strike against the shoulder 1069 on the slide. Hence, if both keys are depressed, a subtract operation will be performed.

*Control key interlocks*

In order to guard against a misoperation of the machine by an inexperienced or inattentive operator, certain of the control keys are interlocked against use with one another. For example, the totalizer selection keys 654 to 657 inclusive and 663 to 666 inclusive are provided with a mechanism which will prevent more than one of the keys in either group from being depressed simultaneously. The mechanism for thus interlocking the keys 663 to 666 is shown in Figures 25 and 29, wherein it will be observed that each of the long studs 1116 secured to the totalizer selection keys 663 to 666 projects through an elongated slot 1231 formed in the partition plate 633. The outer ends of these studs are adapted to cooperate with camming surfaces 1232 formed on a series of pendants 1233 pivotally supported by studs 1234 on the partition plate 633. There is thus provided a "crowding" type of interlock which will prevent more than one of the totalizer selection keys from being depressed at the same time. Although not shown herein, a similar type of interlock is provided for the totalizer selection keys 654 to 657 for the No. 2 to No. 5 totalizers, inclusive, so as positively to prevent the depression of more than one of the totalizer selection keys for this group at the same time.

Means is also provided for preventing the "Total 6–9" key 668 from being depressed with the "Subtract 6–9" key 667, or the "Total 2–5" key 659 from being depressed with the "Subtract 2–5" key 658. The means for interlocking the total and subtract keys for the No. 2 to No. 5 totalizers is shown in Figures 4 and 6 and consists of a pendant 1235 pivotally secured to the partition plate 631 by a stud 1236. The pendant is provided with a pair of camming surfaces 1237, which cooperate with studs 1238 and 1239 mounted in the lower ends of the "Total 2–5" and "Subtract 2–5" keys, respectively. Depression of either key will rock the pendant and cause the other key to be locked against depression. As shown in Figure 9, the "Total 6–9" and "Subtract 6–9" keys 668 and 669 are interlocked in a similar fashion, a pendant 1240 being provided, which is pivotally mounted on the partition plate 632. This pendant is provided with camming surfaces which cooperate with the lower ends of the keys so as to permit the depression of only one key at a time. It is thus impossible to attempt to condition the machine for both a total-taking operation and a subtraction operation at the same time.

Means is also provided for preventing the depression of more than one total key at a time. For example, as shown in Figure 6, the "Balance 1" key 652 is interlocked against use with the "Total 2–5" key 659 by means of a stud 1241 on the "Balance 1" key, which is adapted to cooperate with a camming surface formed on a pendant 1242 pivotally mounted on a stud 1243 secured to the partition plate 631. The pendant 1242 is connected with the pendant 1235 by means of a link 1244, so that, when either one of these two keys is depressed, the pendants will both be rocked and the other key will be blocked against depression. The "Balance 1" key 652 is interlocked against use with the "Total 6–9" key 668 by means of the mechanism illustrated in Figures 7 and 9. As shown therein, the stud 691 on the "Balance 1" key is adapted to cooperate with a camming surface 1255 provided on the slide 701, so as to cause the slide to be moved to the left, as viewed in Figure 7, when the key is depressed. Such movement of the slide will cause the lower end of an arm 1245, which is received within a slot formed in the upper edge of the slide, to be moved in the same direction and thus cause a shaft 1246, to which the arm is secured, to be rocked clockwise, as viewed in Figure 9. Also secured to the shaft 1246 is an arm 1247, which is provided with a camming surface 1248 and a blocking surface 1249, which surfaces are adapted to cooperate with the stud 1133, secured to the stem of the "Total 6–9" key 668. When the shaft 1246 is rocked clockwise upon depression of the "Balance 1" key, the arm 1247 will be moved to the left, as viewed in Figure 9, and so cause the camming surface 1248 to engage against the stud 1133 and thereby prevent depression of the "Total 6–9" key. If, on the next operation of the machine, the "Total 6–9" key is depressed, the stud 1133 will cooperate with the camming surface 1248 to rock the shaft 1246 counterclockwise. This will cause the detent 701 to be moved toward the front of the machine and thus place the camming surface 1255 beneath the stud 691 on the "Balance 1" key. Hence, if the operator attempts to depress the "Balance 1" key, he will find the key blocked against depression, since the stud 1133 has been moved down behind the blocking surface 1249 on the arm 1247, thereby preventing the detent 701 from being moved toward the rear of the machine. The "Total 2–5" key 659 and the "Total 6–9" key 668 are interlocked in a similar manner, the stud 698 (Fig. 7) on the "Total 2–5" key being adapted to cooperate with a camming surface 1250 formed on the detent 701, thereby resulting in an interlocking arrangement which is identical with the "Balance 1"—"Total 6–9" key interlock.

The "Balance 1" key 652 and the "Subtract 1" key 662 are also interlocked so as to prevent simultaneous depression of these keys and a consequent misoperation of the machine. As shown in Figure 9, an interlocking lever 1251 is pivotally supported on a stud 1252, which is secured to the partition plate 632. This lever has a forwardly-extending arm 1253, which is bifurcated so as to embrace the stud 1098 secured to the lower end of the "Balance 1" key 652. The lever also has an upwardly-extending arm 1254, which is adapted to cooperate with the stud 1083 secured to the lower end of the "Subtract 1" key 662. Thus, if the "Balance 1" key is depressed, the upper end of the arm 1254 will move beneath the stud 1083 and thereby prevent depression of the "Subtract 1" key. Vice versa, if the "Subtract 1" key is depressed, the stud 1083 will move in front of the arm 1254 and thus prevent depression of the "Balance 1" key.

*Traveling carriage in general*

As shown in Figures 1 and 3B, the travelling paper carriage consists of a framework which includes a pair of end housings indicated generally at 1261, each housing being formed of an inner casting and an outer casting. The housings 1261 are supported in their spaced positions, as shown in Figure 1, by means of a Z-bar 1264 (Fig. 3B), an L-bar 1265, and an I-bar 1266, to which the inner and outer castings are secured by means of screws or other suitable fastening means.

The Z-bar and the L-bar are secured directly to the end housings, whereas the I-bar 1266 is secured at either end to a bracket 1267, which is bonded to a block of rubber, which is in turn bonded to a second bracket 1269 secured by screws to the end housing. Freedom of movement between the bracket 1267 and the bracket 1269 is provided by means of transversely elongated holes formed in the bracket 1267, within which are located spacing collars (not shown), which are made of slightly thicker material than the bracket 1267 and on which the bracket 1269 is securely clamped by means of the screws 1270. The I-bar is thus free to move against the resilience of the rubber block in a direction along the length of the rail but is prevented from moving relative to the carriage frame in a vertical direction.

The thus-constituted carriage frame is supported for transverse sliding movement on the accounting machine frame by means of a tube 1271 secured to the under side of the L-bar 1265, which tube cooperates with a series of grooved rollers 1272, which are rotatably secured to a rail 217 in turn secured to the machine framework. The tube 1271 also cooperates with a series of conical rolls 1273 located on either side of the tube, those located on the forward side of the tube being mounted on the rail 217 and those located to the rear of the tube being mounted on posts 1274 secured to the rear side of said rail 217. The forward portion of the carriage is supported on rolls 1275, which are received within a groove formed in the I-bar 1266. The rolls 1275 (Fig. 3B) are rotatably mounted on a vertical frame plate 1276, which is secured to the vertical portion of an angle bar 216 by means of mounting posts and studs (not shown), said bar 216 being secured to the machine framework.

The carriage is yieldably driven in either direction across the machine by means of a gear 361 (Fig. 3B), which meshes with a rack 362, secured by screws or other fastening means to the Z-bar 1264. Also secured near each end of the rack are a pair of limit stops (not shown), which cooperate with an upturned ear 1282 formed on a bracket 348 secured to the machine framework, so as to limit the lateral travel of the carriage and prevent it from moving off the ends of the guide rails. The gear 361 is arranged to be rotated in either direction by means of a hydraulic drive mechanism 322 driven by the electric operating motor. Hence, whenever the motor is operating, the carriage will be resiliently urged to move in either a left-hand direction or a right-hand direction across the machine.

Inasmuch as the present machine is intended to function both as an ordinary typewriter and also as an accounting machine, it is necessary that means be provided for enabling the traveling carriage to be letter-spaced in a left-hand or forward direction under the control of the electric typewriter. This letter-spacing movement of the carriage is controlled by an escapement mechanism (not shown) comprising a pair of escapement pawls provided with teeth which are adapted to engage with rack teeth provided along the lower edge of the I-bar 1266 (Fig. 3B). The escapement pawls are pivotally supported on a fixed stud and are resiliently urged into engagement with the rack by springs which are stretched between said pawls and a pair of rebound pawls, which are pivotally mounted on another fixed stud. The holes in the escapement pawls for accommodating the stud are slightly elongated so as to permit the pawls to be moved through a distance equal to approximately one-half of a letter space in a direction corresponding to the length of the I-bar 1266.

The teeth of the two escapement pawls are adapted to be alternately engaged with the teeth of the escapement racks to thereby permit step-by-step letter-spacing movement of the traveling carriage 1261.

The two rebound pawls are provided for preventing the carriage from rebounding when it is stopped by the engagement of one of the teeth of the escapement pawls with the rack teeth. The problem of carriage rebound is not so important in connection with the letter-spacing movement of the carriage, but it may present somewhat of a problem in the case of the tabulating movement of the carriage from one column to another when the machine is performing its accounting machine functions. Teeth on the rebound pawls are spring-urged into engagement with the rack teeth. The rebound pawls are provided with shoulders, which lie beneath the right-hand ends of their associated escapement pawls and are spring-urged into engagement therewith. The design of the escapement and rebound mechanism is such that, whenever a tooth on one of the escapement pawls is engaged with the rack teeth, the tooth of its associated rebound pawl will likewise be engaged therewith. However, when one of the escapement pawls is moved out of engagement with the rack teeth, the associated rebound pawl will likewise be moved out of engagement therewith. Hence, whenever movement of the carriage is arrested by the engagement of an escapement pawl with the rack teeth, the tooth of the rebound pawl connected therewith will likewise engage with the rack teeth and thereby prevent any rebounding of the carriage. Also, whenever one of the escapement pawls is disengaged from the rack teeth, the rebound pawl associated therewith will likewise be carried out of engagement with the teeth so as not to interfere with the free movement of the carriage under the control of the escapement pawls.

The above general description of the traveling carriage and escapement mechanisms is believed to be adequate for the present purpose. However, if a more complete description of these mechanisms is desired reference may be had to the parent application, Serial No. 790,032, now United States Patent No. 2,626,749.

*Carriage stops*

In order to control the tabulating movement of the traveling carriage back and forth across the machine and also to enable the carriage to control the various functions of the accounting machine, a series of carriage stops 1374 are removably secured to an I-shaped stop bar 1375 (Fig. 3B and 32) carried by the traveling carriage. The constructional details of the carriage stops are shown best in Figures 30 and 32 of the drawings, it being noted that the each of the stops is provided with a stop block 1382, which is machined block of metal having two downwardly-extending projections 1381 and 1383, the projection 1381 constituting a forward tabulation stop and the projection 1383 constituting a motor bar enabling lug. The block 1382 is provided on its underneath side with a transverse groove 1384 for receiving a reverse tabulation stop 1385, which is provided with a cylindrical tenon 1386, which is adapted to be received within a hole 1387 bored vertically through the block 1382 and riveted over at its upper end so as to fasten the stop 1385 securely to the block. As shown in Figure 30, the projection 1381 is provided with a horizontally-extending hole 1388, which is adapted to receive a pin 1389 (Fig. 32) formed on the side of an automatic cycling lug 1390, the end of the pin being riveted over so as to securely fasten the lug to the block 1382. The forward tabulation stops are provided in three different lengths: a short or "normal-tab" stop; an intermediate or "skip-tab" stop; and a long or "hold-skip-tab" stop. Similarly, the stops for controlling the tabulating movements of the carriage in the reverse direction are provided in different lengths, the shortest stop being known as the No. 1 reverse tabulation stop, while the other three stops are known as the No. 2, No. 3, and No. 4 reverse tabulation stops.

Each stop block 1382 is provided with a pair of transverse holes 1399 (Figure 30) for enabling a pair of side plates 1400 to be secured thereto. The method of fastening the plates to the block may either take the form of rivets where a permanent type of construction is desired, or screws 1401 (Figure 32) may be used where a temporary set-up is desired. Each of the side plates 1400 is provided with apertures 1402 and notches 1403, which are adapted to receive lugs 1404 formed on the sides of function control plates 1405, the purpose of which will be described in greater detail later herein.

Each of the side plates 1400 is provided with a cut-out 1411 for enabling the stops 1374 to be pushed onto the stop bar 1375, which is provided along its entire length with a series of notches 1412 for receiving the side plates. The bar 1375 is provided at either end with tenons (not shown), which are received within brackets (not shown) mounted near either end of the I-bar 1266, where they are held by means of retaining pins.

As shown in Figure 32, each stop 1374 is adapted to be retained on the bar 1375 by means of a latch 1417, which is pivoted to the side plates of the stop at 1418 and is provided with a hook portion 1419, which is urged into engagement with the flanged portion of the bar by means of a torsion spring 1420. A card-holding element 1421 is secured to the top portion of the latch and is adapted to receive and retain therein a card 1422 bearing printed information identifying the stop to which it is secured.

*Stop sensing mechanism*

As mentioned earlier herein, nearly all of the functions performed by this machine, including totalizer selection and operation, may be controlled by the travelling carriage in preselected columnar position thereof. In order to relieve the travelling carriage of the load which would be imposed upon it if it were required to depress function control levers or like elements in order to effectuate these controls, a sensing mechanism is provided for sensing the function control plates 1405 (Fig. 42) carried by the stops 1374 while the carriage is located in one of its various columnar positions. As shown in Figure 42, the mechanism for controlling the selection and operation of the totalizer consists of sensing fingers 1889 formed on the upper ends of sensing members 1890 and 1891. The sensing members are guided at their upper ends by means of slots formed in a guide plate 1894 secured to a square post 1900, which in turn is secured to the angle bar 216. At their lower ends, each of the members 1890 and 1891 is pivotally connected to one of a series of sensing levers, which are adapted to be controlled by the fingers 1889 as the result of their engagement with the stepped control plates 1405. Thus, each of the sensing members 1890 is pivotally connected to the right-hand end of a sensing lever 1901, which levers are alternately mounted on studs 1902 and 1903 located in a frame plate 1904, which is supported from the vertical portion of the angle bar 216 by means of short posts (not shown). Each lever is urged counter-clockwise by a spring 1906, so as to tend to move the sensing fingers into engagement with the plates 1405. Near its left-hand end, each lever 1901 is provided with a pair of guide fingers 1907 and 1908, which cooperate with grooved studs 1909 and a slotted guide plate 1910, respectively, in order to guide the levers in their up-and-down movements. Lying beneath a finished surface 1911 formed on the lower edge of each of the levers 1901 is a sensing mechanism control slide 1912 (Figs. 20 and 42), which is mounted for vertical sliding movement on a stud 1913 and the stud 824 secured in the side frame 214.

Mechanism shown in Fig. 20 and fully disclosed in the parent application, Serial No. 790,032, now United States Patent No. 2,626,749, and operated by the main cam shaft 253 permits the springs 1906 to first force down the control slide 1912 and thus permit the sensing fingers 1889 to move upward into engagement with the lower edges of the plates 1405. As illustrated in Figure 42, each of the plates 1405 is provided on its lower edge with two abutment surfaces, one adapted to cooperate with the left-hand row of sensing fingers 1889 and the other being adapted to cooperate with the right-hand row of fingers. Either of the abutment surfaces may be cut to any one of four different lengths or heights, the "Zero" length being the equivalent of no plate at all, the "A" or "Addition" length being effective to stop the fingers just short of their full travel, the "S" or "Subtraction" length being effective to stop the fingers in an intermediate position, and the "T" or "Total" length being effective to stop the fingers after they have moved but a very short distance. The sensing fingers 1889 will be restored to their lowered positions, as shown in Figure 42, toward the close of the machine cycle by means of the slide 1912, which is restored upwardly at this time by its operating mechanism.

In the present machine there are three sensing members 1891 (Fig. 42), which are provided with sensing fingers 1889, and said members 1891 are pivotally connected to the right-hand end of sensing levers 1966, which are pivoted on the stud 1993 and are similar in shape to the levers 1901, at their left-hand ends.

*Totalizer selection from carriage stops*

Referring now to Figures 25, 27 and 42, it will be seen that the left-hand ends of the sensing levers 1901 and 1966 are provided with formed-over ends 1969, which engage beneath the ends of levers 1970 pivotally mounted on a rod 1971, which is supported between the bracket 833 and a frame plate 1972. Each of the levers 1970 is provided at its rear end with a stud 1973, which engages in a bifurcation provided in an arm 1974 pivotally mounted on a rod 1975 supported between the bracket 833 and the frame plate 1972. Each of the arms 1974 is urged to rotate counterclockwise about the rod 1975 by means of a spring 1976, so as to cause the arm and the lever 1970 to follow the downward movement of the left-hand ends of the sensing levers 1901 and 1966 when the machine is operated. Pivotally mounted on the rod 1975, adjacent to each of the arms 1974, is a stop arm 1977, which bears a stud 1978, which is held in engagement with a shoulder, formed on the arm 1974, by means of a spring 1979, which is stretched between the two arms. Each stop arm 1977 is provided with a stop finger 1980, which is adapted to cooperate with the graduated shoulders formed on a sensing pitman 1981. Each pitman is pivotally connected at its forward end to one of the totalizer control levers 1056 and is guided at its rear end by means of an open-ended slot 1982, which cooperates with a rod 1983 supported between the bracket 833 and the frame plate 1972. It will thus be seen that the fingers 1059, which control the totalizer engaging hooks 1027, may be controlled by the pitman 1981 instead of by the totalizer slides 1051, so as to establish a joint key and carriage control over the operation of the totalizers. The rear end of each pitman is provided with two shoulders 1984 and 1985, which are adapted to cooperate with the end of the stop finger 1980 associated therewith and to locate the finger 1059 in its adding and total-taking positions, respectively. A third and shiftable abutment surface is provided on each of the pitmans, this surface consisting of the end of a bar 1986, which is pivoted at its forward end to the pitman 1981 and which is adapted to cooperate with the end of the finger 1980 to locate the finger 1059 in its subtract position.

The positions taken up by the stop finger 1980 under the control of the sensing levers 1901 and 1966 are shown in dot-and-dash outline in Figure 27. As shown herein, when no control plate 1405 is present to stop the sensing finger 1889 in its upward travel, the finger 1980 will move to its highest or "Zero" position, so as to permit a non-add operation of the totalizer. When an "A" length stop is located above the sensing finger 1889, the finger 1980 will take up the "A" position and thereby permit the pitman to move toward the left as viewed in Figure 27, until the shoulder 1984 engages with the finger to stop the finger 1059 in its adding position. When an "S" control plate is located above the sensing finger, the finger 1980 will be raised to the "S" position, shown in Figure 27, so as to cooperate with the end of the bar 1986 and stop the pitmans and the finger 1059 in the subtracting position. In a similar manner, a "T" control plate 1405 will cause the finger 1980 to take up a "T" position, so as to engage the shoulder 1985 formed on the pitman and thereby position the finger 1059 in its total-taking position.

The flexible connection between the arm 1974 and the stop arm 1977, consisting of the spring 1979 and the stud 1978, is provided in order to permit the slide 1912, which controls the sensing movement of the levers 1901 and 1966, to be restored earlier in the machine cycle than is the bail 1060, which controls the fingers 1059 and the pitman 1981. Any of the stop fingers 1980 which are abutting against the shoulders 1984 on the pitman 1981 when the sensing lever are restored will be prevented from returning to home position by the total-taking shoulder 1985. By virtue of the flexible connection between the arms 1974 and 1977, however, the sensing levers may be fully restored, due to stretching of the spring 1979. When the pitman 1981 is subsequently returned to its Figure 27 position, the finger 1980 will snap down to its home position, and the stud 1978 will again engage with the shoulder formed on the arm 1974.

The mechanism just described is the same for each of the totalizers 1 to 9, inclusive, and also for the "X" totalizer which, as mentioned earlier herein, may be selected for adding, subtracting, and total-taking operations from the carriage stops, although no provision is made for selecting this totalizer from the keyboard. In the case of the sub-total-taking control mechanism, a slightly different form of pitman is utilized.

Referring now to Figures 33 and 42, the sensing finger 1889 for the sub-total position is pivotally connected to a sub-total sensing lever 1987, which is similar to the levers 1901. The left-hand end of this lever is formed over so as to engage beneath one of the levers 1970 pivotally mounted on the rod 1971. A stop finger 1980 is adapted, when moved to its "A" position, as shown in dot-and-dash outline in Figure 33, to cooperate with the end of a sub-total pitman 1988, which is pivotally connected at its forward end to a sub-total lever 1192 and is slidably guided at its rear end on the rod 1933 in the same manner as the regular pitmans 1981. Hence, when an "A" length control plate 1405 is located above the sub-total sensing finger 1889, the pitman 1988 will be stopped by the finger 1980, so as to position the sub-total control slide 1190 in the proper location for causing a sub-total-taking operation to ensue. However, if no control plate is present, or if an "S" or a "T" length control plate is located above the sub-total sensing finger, the pitman 1988 will not be stopped by the finger 1980, and the slide 1190 will be permitted to move all the way forward in the machine, thereby preventing a sub-total-taking operation.

*Totalizer reverse key*

As mentioned previously, the bars 1986, which cooperate with the fingers 1980 (Figs. 26, 27 and 28) to stop the fingers 1059 in their subtract positions, are pivotally secured to the pitmans 1981, thereby enabling the bar to be shifted up or down with relation to the pitman. The means for accomplishing this shifting movement is shown in Figure 28 and consists of the "Reverse" key 671, which bears a stud cooperating with the bifurcated end of a lever 1989 pivoted on a stud 1990 secured to the partition plate 633 (see also Figure 12). The lever 1989 has a depending arm which cooperates with a stud 1991 mounted in an arm 1992 loosely journaled on the shaft 1058. Movement of the arm 1992 is communicated to a triangular plate 1993 by means of a link 1995. The plate 1993 is secured to a shaft 1994, which is journalled at one end in the bracket 833 and at the other end in the frame plate 1972. As shown in Figure 26, a second triangular plate 2000 is secured to the shaft 1994 in spaced relationship with respect to the plate 1993 and is further secured to the latter plate by means of a rod 2001 extending therebetween. Pivotally supported on this rod is a series of shifting forks 2002, which are provided with slots 2003 for engaging with studs 2004 mounted in the bars 1986. Each of the shifting forks is also provided with a vertically-disposed slot 2005, which engages with the rod 1983 to thereby guide the shifting forks in their up-and-down movements within the machine. A spring 2006, connected to the rod 2001, urges the rod and the triangular plate to rotate clockwise about the center constituted by the shaft 1994, so as to maintain the shifting forks in their lower or normal positions.

When the "Reverse" key 671 is depressed, the shifting forks will be elevated, thereby lifting the bar 1986 from the position shown in Figure 27 into a position where it will cooperate with the end of the stop finger 1980 when the latter is in the dot-and-dash position indicated at "A" in Figure 27. Thus, an "A" length control plate 1405 will cause the finger 1059 to be positioned in its subtracting condition, while an "S" length control plate will permit the pitman to move to the left until the shoulder 1984 abuts against the end of a stop finger 1980, thereby causing an adding operation to take place. This reversal of the add and subtract selection of the totalizers under control of the carriage stops may be used in correcting an erroneous entry in the totalizers, for handling return items, and in various other transactions as will be described in a later section in connection with an example of the type of work which may be performed on the present machine.

*Example of operation*

In order to provide a better understanding of the functioning of the machine as a whole, a typical accounting problem will be described in connection with the accounts payable form illustrated in Fig. 41 of the drawings. The method for handling accounts payable, to be described hereinafter, is typical of the methods used by the larger department stores, which are organized on the basis of a large number of closely integrated but financially independent departments. The system shown herein consists of a department journal sheet 1858, which is held in position on the platen of the carriage by means of the upper and lower compression rolls and a vendor's ledger card, which is located in front of the journal sheet and held in position by means of the forward compression rolls.

Supposing, for example, that it is desired to post the accounts payable for the Chinawares Department of the A. B. C. Department Store for the month of January. In this case, the journal sheet 1858 for the Chinawares Department is placed in the machine, as shown in Fig. 1, and the ledger card of a vendor of goods to this department is placed in the machine in front of the journal sheet, with a piece of carbon paper in between. Then the carriage is returned to the #1 column, if it is not already in this position, by depression of the #1 "Reverse Tab" key 1583 (Fig. 2). The previous balance of the vendor's account is found in column #10 of the ledger card and will be the last item posted in this column. A shown in Fig. 41, in the case of the vendor, John E. Smith Company, this amount is $300.00, this amount being set up on the keyboard of the accounting machine and the motor bar depressed so as to cause this amount to be printed in column #1 of the journal sheet and added into the #1 totalizer of the machine. At the conclusion of this operation, the traveling carriage will be permitted to tabulate to column #2. Next to be posted is the information taken from the invoice for a particular shipment of goods by John E. Smith Company to the Chinawares Department of the A. B. C. Department Store. The first entry taken from the invoice is made in column 2 of the journal and represents the retail selling price of the goods carried on the invoice. This amount—namely, $200.00—is set up on the keyboard of the machine and the motor bar is depressed so as to cause the amount to be printed and also entered into the #7 totalizer of the machine, so as to provide a total of the retail value of the merchandise bought by the Chinawares Department. At the end of the machine cycle in column #2, the carriage tabulates to column #3, where it is stopped by the #1 or normal tab stop ready for printing the markup of the goods. Since the markup on this particular shipment of goods is 100%, the operator sets up 100.00 on the keyboard of the machine and presses the motor bar, thereby causing the "100" to be printed in column #3. It will be noted that printing in the units and tens of cents places is suppressed, this being controlled from the carriage stops in the manner described hereinbefore.

At the end of this cycle, the carriage is allowed to tabulate to the #4 column, where it is stopped by a normal tab stop so as to enable the receiving entry number— namely, 5701—appearing on the invoice to be printed on the journal sheet. Here again, the printing of amounts in the units and tens of cents orders is suppressed by means of the control exercised by the carriage stop for this column. The operations in columns #3 and #4 are purely printed operations, and no totalizer is selected to receive the entry in either of these columns. The carriage then tabulates into the #5 column, where it is stopped by a hold-skip stop. The presence of this stop in the #5 column makes it possible for the operator of the machine to tabulate the carriage directly to this column from any one of the preceding columns by merely depressing and holding down the skip tab motor bar, which causes the tabulating stop arm to cooperate with only the #3 stop which is present in columns #2, #3, and #4. In the #5 column, the date, January 2, is set up on the date keys, and the amount of the goods listed on the invoice ($100.00) is set up on the amount keys, after which the motor bar is depressed so as to cause the date and the amount to be printed in column #5 and the amount of the invoice to be added into totalizer #1 and totalizer #3. The control of date printing and of totalizer selection is effected by the use of the proper control plates in the stop for this column (see Fig. 41).

At the end of the cycle, the carriage will be allowed to tabulate into column #6, where it will be stopped by the #1 tab stop, which is present in this column. The class of the goods and the rate of the discount are printed in a single operation in two separate columns, this being effected by means of the split provided in the printing mechanism between the fifth and sixth orders and also by means of the non-printing control for suppressing printing in the units and tens of cents orders, as described in connection with columns #3 and #4. The split in the printing mechanism and the non-printing of the units and tens of cents orders are both controlled from the carriage stop located in this column. The carriage then tabulates into column #7, where it is stopped by a #1 or normal tab stop, and the amount of the discount, in this instance $2.00, is set up on the amount keys and an operation initiated to cause the amount of the discount to be subtracted from the #1 totalizer and added into the #4 totalizer. Since this is a subtractive entry in the #1 totalizer, the amount is printed in red, and, as desired, may or may not be followed by a minus sign.

At the end of the cycle, the carriage tabulates into the #8 column, where it is stopped by a #2 stop. The amount of the anticipation discount (fifty cents) is then set up on the keyboard and an operation initiated to cause this amount to be subtracted from the #1 totalizer and added into the #5 totalizer. Here again, the amount is printed in red, since it is a subtractive entry in the #1 totalizer. The carriage then tabulates into the #9 column, where it is stopped by a #2 tab stop, and the amount of the freight or express charges ($1.35) is set up on the keyboard and an operation initiated to cause this amount to be subtracted from the #1 totalizer and added into the #6 totalizer. This item is also printed in red and may or may not have the minus sign printed thereafter, as mentioned earlier. Since there is another invoice to be entered on the journal sheet and on the ledger card of John Smith & Company, it is desirable to return the carriage to the #2 column at the conclusion of the operation in the #9 column. This return to the #2 column may be effected automatically by the operator when he enters the amount ($1.35) in the #9 column by holding the motor bar fully depressed with the motor bar control lever in the #1, or rear, position, and after the carriage arrives in the #2 column the machine will be ready to receive the information provided on the second invoice of John Smith & Company.

The retail value of the goods on the second invoice is $75.00, and this amount is entered in column #2, after which the carriage is tabulated to column #3, where the markup of 50% is entered. In column #4, the receiving entry number 5,689 is entered, and the carriage then tabulates to column #5, where the date and the amount of the invoice are printed and the amount entered in the #1 and #3 totalizers, as described above. The carriage then tabulates into the #6 column, where the number designating the class of goods is printed by means of the split feature described earlier herein. Since there are no discount or anticipation entries to be made in columns #7 and #8, the traveling carriage is skip-tabulated to skip these columns and said carriage is stopped in the #9 column.

After entering the amount of the freight (75¢) to be paid by the vendor, the motor bar is depressed so as to cause the carriage to tabulate into column #10, where it is stopped by a #3 tab stop. The carriage stop in the #10 column is also provided with an automatic cycling lug for causing the machine to be automatically cycled in this column. This stop is also provided with control plates which select the #1 totalizer for a total-taking operation and the #2 totalizer for an adding operation. Accordingly, when the carriage tabulates into the #10 column, the machine will be automatically cycled and will print and clear the total of the amount representing the net balance due to John Smith & Company from the #1 totalizer and cause this amount to be added into the #2 totalizer, so as to provide a total of all accounts payable. The carriage then tabulates into column #11, where the rate of the loaded discount (20%) is printed, the printing of zeros in the tens and units of cents orders being automatically suppressed in this operation. Near the end of the operation in this column, the carriage is released for movement to the #12 column, where it is stopped by a #1 tab stop and the amount of the discount ($10.00) is set up on the amount keys and an operation initiated to cause this amount to be printed on the journal sheet and entered into #8 totalizer. The carriage then tabulates into column #14, and the voucher number 6798 is set up on the keyboard and printed in this column, with the tens and units of cents orders being non-printed under control of the carriage stop. The carriage then tabulates into column #15, where no entry is made, since the freight was charged to the vendor. However, the arrangement of columns #13, #14, and #15 of the journal sheet is such that, when the carriage is located in the last or #15 column, the journal sheet will be in proper relation with respect to the typewriter mechanism to permit the operator to commence typing the name of the vendor at the left margin of column #13. Accordingly, the words "John Smith and Company" are typed in column #13 by use of the electric typewriter, and, if a second line of typing is needed in this column, such as the address of the company, the carriage may be returned from the right margin of column #13 to the left margin thereof by operation of the proper "Reverse Tab" key on the typewriter keyboard, which also causes the form to be line-spaced. Operation of the "Reverse Tab" key will cause the carriage to be moved back into the #15 column and bring the left side of the #13 column into the typewriter printing position. After the typing in the #13 column has been completed, the carriage may be returned to the #1 column by operation of the proper "Reverse Tab" key on the typewriter keyboard.

While the carriage is being returned to the #1 column in the manner mentioned above, the carriage throat may be opened and the ledger card for John Smith and Company may then be removed from the carriage.

The third invoice to be posted is one from Thomas Brown and Sons, and, accordingly, the ledger card for this company is now slid into the carriage through the front-feed throat opening, after which the throat is closed. The previous balance ($135.00) on the ledger card is then picked up, and entered in the first column of the journal sheet and added into the #1 totalizer, after which the carriage tabulates to the #2 column. Here, the retail value of the goods ($150.00) is entered, after which the markup, the receiving entry number, and the date and the amount of the invoice are printed in columns #3, #4, and #5 respectively. The class of goods and the rate of discount are next printed in column #6, after which the dollar amount of the discount and also of the anticipation are entered in columns #7 and #8. Since there is no entry to be made in column #9, the operator uses the skip tab motor bar for #8 column and, by holding this motor bar depressed, causes the carriage to skip the #9 column and tabulate directly to the #10 column. Here, the machine is given an automatic cycle of operation, so as to cause the total in the #1 totalizer to be taken and printed on the ledger and journal.

Next, the rate of the loaded discount is printed in column #11 of the journal sheet, after which the carriage tabulates into column #12, where the amount of the loaded discount is printed and added into totalizer #8. The carriage then moves into column #14, where the voucher number is printed, and then into column #15, where the freight charge ($1.45) is printed on the journal sheet and also added into the #9 totalizer by means of a suitable control plate in the column #15 stop. The carriage is prevented from tabulating out of #15 column, and it is therefore in position for the typing of the name of the vendor's name in column #13, as explained above. After the typing has been accomplished in column #13, the carriage is returned to column #1 by operation of the proper "Reverse Tab" key on the typewriter keyboard.

The fourth entry on the record form illustrated herein serves to illustrate the use of the "Reverse" key 671 (Fig. 2) which was described earlier herein. In this case, let it be supposed that the A. B. C. Department Store purchased chinaware from the Arnold Pottery Company in Clayville, Ohio, and that a portion of this merchandise was to be returned to the Arnold Pottery Company. In making a posting of this sort, it is necessary to reverse the sign of the various entries in order to maintain the correct balances in the accounts kept in the various totalizers of the machine. The ledger card of the Arnold Pottery Company is placed in the carriage and the throat is closed, after which the previous balance of $25.00, as indicated on the ledger card of this company, is entered in column #1 and added into totalizer #1. In column #2, the retail value of the goods being returned to the Arnold Pottery Company—namely, $75.00—is set up on the keyboard and the "Reverse" key is depressed, after which the motor bar is operated to cause this amount to be printed in column #2. At the same time, this amount is subtracted from totalizer #7, on which the retail value of the goods charged to the Chinawares Department is accumulated.

In columns #3 and #4, the markup and the receiving entry number are printed, after which the carriage tabulates into column #5, where the cost price of the goods being returned is subtracted from the #1 and #3 totalizers and printed with the reverse symbol on the record material, along with the date of the invoice on which the goods were shipped. In column #6, the class of goods and the rate of discount are printed side by side, after which the carriage tabulates to column #7, where the amount of the discount previously claimed on this item is printed in black with the reverse symbol and added into the #1 totalizer and subtracted from the #4 totalizer. The carriage then moves into column #8, where the anticipation is added into totalizer #1 and subtracted from totalizer #5. The anticipation is entered by use of the skip tab motor bar, which is held down so as to cause the carriage to skip column #9 and tabulate directly into column #10, where the machine is given an automatic cycle of operation and caused to automatically print the credit balance of $23.75 in red with the "CR" symbol and to subtract this amount from the #2 totalizer in which the total amount of the accounts payable is accumulated. Since no entries are to be made in columns #11, #12, #14, and #15, the operator depresses the Typewriter Tab key and thus causes the carriage to be tabulated to the proper location for the typing of the vendor's name in column #13. After the words "Arnold Pottery Company" have been typed on the first line, the carriage may be returned to the left-hand margin of column #13 for a second line of typing by use of the proper "Reverse Tab" key, located on the typewriter keyboard, which, as explained above, will set the reverse tab stop arm to cooperate with the #2 reverse tab stop located in column #15. After the typing of the vendor's name and address has been completed, the carriage may be returned to column #1 by depression of the proper "Reverse Tab" key, and the carriage throat may be opened so as to enable the ledger card of the Arnold Pottery Company to be removed from the carriage and another lerger card to be placed in position therein for performing further work along the line of that described above. The "Reverse" key is not a stay-down type of key and must be manually depressed in each of the columns #2, #5, #7, and #8.

After the accounts payable have been posted to the Chinawares Department of the A. B. C. Department Store, the departmental journal sheet may be removed from the carriage and the journal sheet of another department of the store placed therein preparatory to posting the accounts payable for this department. Before the departmental journal sheet is thus removed from the carriage, the various totalizers in which the different types of entries were stored may be totaled or sub-totaled in their respective columns of the journal sheet, so as to record the totals of these items.

While the form of mechanism herein shown and described is admirably adapted to fulfill the objects primarily stated, it is to be understood that it is not intended that the invention shall be confined to the particular embodiment disclosed herein but rather that it shall extend to all structures employing the principles taught herein.

What is claimed is:

1. In a machine of the class described, the combination of means for giving the machine cycles of operation; a totalizer; a plurality of differential actuators for said totalizer; means for engaging and disengaging said totalizer and said actuator; means for controlling the time of engagement of said totalizer and said actuators during a cycle of operation of the machine, said means including a member which is reciprocated once on each cycle of operation of the machine; a first control key; means on said control key for stopping said member in a position in which said totalizer will be engaged with said actuators during one part of the machine cycle; an element adjustably mounted on said first control key, said element being normally ineffective to stop said member during a machine cycle; a second control key; and means for operatively connecting said second control key with said adjustable element so as to cause said element to be rendered effective when said second control key is manipulated, so as to stop said mmber in a position in which said totalizer will be engaged with said actuators during another part of the machine cycle.

2. A calculating machine comprising in combination means for giving the machine cycles of operation; a totalizer; a plurality of differential actuators for said totalizer; means for engaging and disengaging said totalizer and said actuators; means, including a sensing member, for controlling the time of engagement of the totalizer with said actuators during each cycle of operation of the machine; an abutment on said member; a first depressible key; a stud on said key adapted to cooperate with said abutment when said key is depressed to thereby stop said member in a position in which said totalizer will be engaged with said actuators during one part of the machine cycle; a control element pivotally mounted on said stud, said element normally lying out of the path of said abutment when said key is depressed; a second depressible key; and means cooperating with said second key and connected with said control element for causing said element to be moved into the path of said abutment when said second key is depressed and thereby stop said sensing member in a position in which said totalizer will be engaged with said actuators during another part of the machine cycle.

3. In a machine of the class described, having a totalizer capable of various types of operations, the combination of means including a positionable slide to select and condition the totalizer for said various types of operations; a first control key effective upon depression to position the slide to cause the totalizer to be selected and conditioned for one type of operation; a slide-positioning element mounted upon the control key, said element normally ineffective; and a second control key operably connected to the element and effective upon depression in conjunction with the first control key to cause said element to position the slide, to cause the totalizer to be selected and conditioned for another type of operation.

4. In a machine of the class described, having a totalizer capable of various types of operations, the combination of means including a positionable slide to select and condition the totalizer for said different types of operations; a first operable means movable upon operation into the path of the slide to position said slide to cause the totalizer to be selected and conditioned for one type of operation; an element mounted on the first operable means, said element constructed and arranged to coact with the slide, said element normally out of coacting relationship with said slide, but movable into such relationship upon operation of the first operable means; and a second operable means effective upon operation in conjunction with the first operable means to move the element into the path of the slide to position said slide to cause the totalizer to be selected and conditioned for another type of operation.

5. In a machine of the class described, having a totalizer capable of adding, subtracting, and total-taking operations, the combination of means including a positionable slide, movable to various positions to select and condition the totalizer for various types of operations; means to yieldingly move the slide in a totalizer selecting and conditioning direction and to positively return said slide to normal or home position each machine operation; a depressible add key coacting with the slide upon depression to interrupt the initial movement of said slide in a position to cause said slide to select and condition the totalizer for an adding operation; a subtract element mounted on the key; a total element mounted on the key, said elements constructed and arranged to coact with the slide, said elements normally out of coacting relationship with said slide, but movable into such relationship upon depression of said add key; a subtract key effective upon depression in conjunction with the add key to cause the subtract element to interrupt the initial movement of the slide in a position to cause said slide to select and condition the totalizer for a subtract operation; and a total key effective upon depression in conjunction with the add key to cause the total element to interrupt the initial movement of the slide in a position to cause said slide to select and condition the totalizer for a total-taking operation.

6. In a machine of the class described, having a plurality of totalizers capable of various types of operations, the combination of means including a positionable slide for each totalizer, to select and condition said totalizers for said various types of operations; a selecting key for each totalizer, said keys effective upon depression to position the corresponding slide, to cause the corresponding totalizer to be selected and conditioned for one type of operation; a slide-positioning element mounted on each selecting key, said elements normally ineffective; a control key common to all the totalizers; and means to operably connect the control key to all the elements so that depression of said control key in conjunction with any selecting key will cause the corresponding element to position the corresponding slide, to cause the corresponding totalizer to be selected and conditioned for another type of operation.

7. In a machine of the class described, having a plurality of totalizers constructed and arranged to perform various types of operations, and actuators for the totalizers, the combination of a separate means for each totalizer to engage and disengage the corresponding totalizer and the actuators; a constant displacement device to operate all the engaging and disengaging means; means to connect each engaging and disengaging means to the constant displacement device; means including a positionable slide for each totalizer to control the corresponding connecting means to cause the totalizers and the actuators to be engaged and disengaged in proper timing for the type of operation being performed; a selecting key for each totalizer, said keys effective upon depression to position the corresponding slide to cause the corresponding totalizer and the actuators to be engaged and disengaged in proper timing for one type of operation; a slide-positioning element mounted on each selecting key, said elements normally ineffective; a control key common to all the totalizers; and means to operably connect the control key to all of the elements so that depression of said control key, in conjunction with any selecting key, will cause the corresponding element to position the corresponding slide to cause the corresponding totalizer and the actuators to be engaged and disengaged in proper timing for another type of operation.

8. In a machine of the class described, having a traveling carriage, an add-subtract totalizer, and actuators for the totalizer, the combination of means to engage and disengage the totalizer and the actuators; means to connect the engaging and disengaging means to the totalizer in proper timing for the type of operation being performed; a stop element positionable in either add or subtract position under control of the traveling carriage; means including a main sensing member coacting with the stop element when in either add or subtract position to control the connecting means to cause the totalizer and the actuators to be engaged and disengaged in add timing; an auxiliary sensing member connected to the main sensing member and normally effective to coact with the stop element when in subtract position to control the connecting means to cause the totalizer and the actuators to be engaged and disengaged in subtract timing; and means to move the auxiliary sensing member relatively to the main sensing member, from its normal position to a position where it will coact with the stop element in add position, to reverse the add and subtract functions in the totalizer.

9. In a machine of the class described, having a traveling carriage, an add-subtract totalizer, and actuators for the totalizer, the combination of means including a constant displacement device to engage and disengage the totalizer and the actuators; means comprising a part positionable in relation to the constant displacement device to connect said device to the totalizer in proper timing for the type of operation being performed; a stop element positionable in either add or subtract position under control of the traveling carriage; means including a main sensing member coacting with the stop element when in either add or subtract position to position the part in relation to the constant displacement device to cause the totalizer and the actuators to be engaged and disengaged in add timing; a movable auxiliary sensing member connected to the main member and normally effective to coact with the stop element when it is in subtract position to nullify the action of the main sensing member and thus to position the part in relation to the constant displacement device to cause the totalizer and the actuators to be engaged and disengaged in subtract timing; and means comprising a manipulative member to move the auxiliary sensing member relatively to the main sensing member from normal position to a position where it will coact with the stop element when it is in add position, and to where said main member will coact with the stop element when it is in subtract position to reverse the add and subtract functions of the totalizer.

10. In a machine of the class described, having a traveling carriage, a totalizer capable of several types of operations, and actuators for the totalizer, the combination of means to engage and disengage the totalizer and the actuators; means to connect the totalizer and the engaging and disengaging means in proper timing for the type of operation being performed; means including a main sensing member to control the operation of the connecting means; a stop element positionable in either of two positions and engageable by the main sensing member when in either of its two positions to cause said member to control the operation of the connecting means to engage and disengage the totalizer and the actuators in proper timing for one type of operation; and auxiliary sensing member positionably connected to the main sensing member and engageable with the stop element when said stop element is in either of its two positions to cause said auxiliary member to control the operation of the connecting means to engage and disengage the totalizer and the actuators in proper timing for another type of operation, said auxiliary sensing member normally in position to coact with the stop element when it is in a certain one of its two positions; and manually-operable means to move the auxiliary member to a position where it will coact with the stop element when it is in the other of its two positions to reverse the type of operation being performed in the totalizer.

11. In a machine of the class described, having a traveling carriage, a plurality of add-subtract totalizers, and actuators for the totalizers, the combination of means comprising a constant displacement device to engage and disengage the totalizers and the actuators; separate means for each totalizer to connect the corresponding totalizer and the constant displacement device in proper timing for add or subtract operations, each of said connecting means including a part positionable in relation to said constant displacement device; a stop element for each totalizer positionable in add or subtract position under control of the traveling carriage; means comprising a main sensing member connected to each part and constructed and arranged to coact with the corresponding part and the corresponding stop element when said element is in add or subtract position to properly position said part in relation to the constant displacement device to cause the corresponding totalizer and the actuators to be engaged and disengaged in add timing; a positionable auxiliary stop member connected to each main stop member and normally positioned to coact with the corresponding stop element when it is in subtract position to properly position the corresponding part in relation to the constant displacement device to cause the corresponding totalizer and the actuators to be engaged and disengaged in subtract timing; and a manipulative member operatively connected to all of the auxiliary stop members and effective upon being manipulated to move said auxiliary stop members relatively to the corresponding main stop members from normal position to positions where said auxiliary members will coact with the corresponding stop elements when they are in add position to cause the corresponding totalizers and the actuators to be engaged and disengaged in subtract timing to reverse the types of operations being performed in said totalizers.

12. In a machine of the class described, having a traveling carriage; an add-subtract totalizer; and actuators for the totalizer, the combination of a constant displacement device to engage and disengage the totalizer and the actuators; means including a part positionable in relation to the constant displacement device to connect the totalizer to said constant displacement device; a stop element positionable in either add or subtract position under control of the traveling carriage in preselected columnar positions thereof; a finger for positioning the part in relation to the constant displacement device; an add sensing member connected to the finger and constructed and arranged to coact with the stop element when it is in either add or subtract position; a subtract sensing member movably connected to the add sensing member and normally arranged to coact with the stop element when it is in subtract position and thus prevent coaction between said stop element and the add sensing member; regularly excursioned means for operating the sensing members and the finger to cause said members to coact with the stop element to position the part in relation to the constant displacement device to cause the totalizer and the actuators to be engaged and disengaged in either add or subtract timing, depending upon the position of said stop element; a control key; and means operable by the control key to move the subtract sensing member to a position where it will coact with the stop element when said element is in add position and to permit the add sensing member to coact with said stop element when it is in subtract position to reverse the add and subtract functions of said totalizer.

13. In a machine of the class described, having a totalizer capable of various types of operations, the combination of means including a positionable slide to select and condition the totalizer for said various types of operations; a first manually operable means effective upon operation to position the slide to cause the totalizer to be selected and conditioned for one type of operation; a slide positioning element mounted on the first manually operable means and movable from an ineffective position to a partially operated position by operation of said first manually operable means; and a second manually operable means connected to the element and effective when operated in combination with the first manually operable means to complete the operation of said element to position the slide to cause the totalizer to be selected and conditioned for another type of operation.

14. In a machine of the class described, having a totalizer capable of various types of operations, the combination of means including a positionable slide to select and condition the totalizer for said various types of operations; a first control key effective upon depression to position the slide to cause the totalizer to be selected and conditioned for one type of operation; a second control key; and a slide-positioning element operatively connected to the two control keys, said element constructed and arranged to be partially operated by depression of either of said control keys and to be fully operated by depression of both of said control keys, and effective when fully operated to position the slide to cause the totalizer to be selected and conditioned for another type of operation.

15. In a machine of the class described, having a totalizer capable of various types of operations, the combination of means including a positionable slide to select and condition the totalizer for said various types of operations; a first manually operable means to position the slide to cause the totalizer to be selected and conditioned for one type of operation; an element mounted on and operable in unison with the first manually operable means, said element constructed and arranged to coact with the slide; a second manually operable means; and means to operatively connect the second manually operable means to the element, whereby operation of both of said manually operable means causes said element to position the slide to cause the totalizer to be selected and conditioned for another type of operation.

References Cited in the file of this patent

UNITED STATES PATENTS

| | | |
|---|---|---|
| 2,234,669 | Fettig | Mar. 11, 1941 |
| 2,298,202 | Crosman | Oct. 6, 1942 |
| 2,442,402 | Davidson et al. | June 1, 1948 |
| 2,657,854 | Demeulenaere | Nov. 3, 1953 |